(12) United States Patent
Misaizu et al.

(10) Patent No.: US 12,292,962 B2
(45) Date of Patent: May 6, 2025

(54) INFORMATION PROCESSING APPARATUS AND INFORMATION PROCESSING METHOD

(71) Applicant: SONY CORPORATION, Tokyo (JP)

(72) Inventors: Tadayuki Misaizu, Kanagawa (JP); Norihiro Fujita, Kanagawa (JP); Tsutomu Nakatsuru, Tokyo (JP)

(73) Assignee: SONY CORPORATION, Tokyo (JP)

( * ) Notice: Subject to any disclaimer, the term of this patent is extended or adjusted under 35 U.S.C. 154(b) by 956 days.

(21) Appl. No.: 16/964,594

(22) PCT Filed: Dec. 28, 2018

(86) PCT No.: PCT/JP2018/048405
§ 371 (c)(1),
(2) Date: Jul. 23, 2020

(87) PCT Pub. No.: WO2019/155792
PCT Pub. Date: Aug. 15, 2019

(65) Prior Publication Data
US 2021/0049260 A1 Feb. 18, 2021

(30) Foreign Application Priority Data
Feb. 7, 2018 (JP) .................. 2018-020431

(51) Int. Cl.
*G06F 21/51* (2013.01)
*G06F 9/455* (2018.01)
*G06F 21/57* (2013.01)

(52) U.S. Cl.
CPC .......... *G06F 21/51* (2013.01); *G06F 9/45558* (2013.01); *G06F 21/57* (2013.01);
(Continued)

(58) Field of Classification Search
None
See application file for complete search history.

(56) References Cited

U.S. PATENT DOCUMENTS 7,702,843 B1  4/2010  Chen et al.
7,716,446 B1  5/2010  Chen et al.
(Continued)

FOREIGN PATENT DOCUMENTS

CA    2940995 A1    9/2015
CN  101826028 A    9/2010
(Continued)

OTHER PUBLICATIONS

Partial European Search Report of EP Application No. 18905817.5, issued on Feb. 10, 2021, 14 pages.
(Continued)

*Primary Examiner* — Benjamin E Lanier
(74) *Attorney, Agent, or Firm* — CHIP LAW GROUP

(57) ABSTRACT

An information processing apparatus and an information processing method capable of improving convenience of a device in which a virtual machine is able to operate are provided. The information processing apparatus includes a processing unit having a function for controlling execution of processing regarding a virtual machine, in which a virtual machine program that operates the virtual machine is associated with condition information that includes information indicating a region of a recording medium and indicates a condition under which the virtual machine is operated, a code of the virtual machine program, and a first electronic signature generated on the basis of the condition information, and the processing unit controls the execution of the processing regarding the virtual machine on the basis of a confirmation result of the first electronic signature associated with the virtual machine program.

14 Claims, 13 Drawing Sheets

(52) U.S. Cl.
CPC .............. *G06F 2009/45587* (2013.01); *G06F 2009/45591* (2013.01)

(56) References Cited

U.S. PATENT DOCUMENTS

| | | | |
|---|---|---|---|
| 8,095,931 | B1 | 1/2012 | Chen et al. |
| 9,250,943 | B2 | 2/2016 | Chen et al. |
| 2002/0002702 | A1 | 1/2002 | Shiobara et al. |
| 2010/0198973 | A1 | 8/2010 | Jung et al. |
| 2010/0241785 | A1 | 9/2010 | Chen et al. |
| 2012/0110577 | A1 | 5/2012 | Chen et al. |
| 2013/0132957 | A1 | 5/2013 | Chen et al. |
| 2013/0145377 | A1 | 6/2013 | Chen et al. |
| 2013/0227296 | A1* | 8/2013 | Lee ........................... G06F 1/26 713/176 |
| 2014/0189195 | A1 | 7/2014 | Chen et al. |
| 2014/0230024 | A1 | 8/2014 | Uehara et al. |
| 2014/0244950 | A1* | 8/2014 | Baron .................. G06F 3/0605 711/162 |
| 2015/0039891 | A1* | 2/2015 | Ignatchenko ....... H04L 63/0853 718/1 |
| 2015/0254451 | A1 | 9/2015 | Doane et al. |
| 2016/0034298 | A1 | 2/2016 | Doane et al. |
| 2016/0164880 | A1* | 6/2016 | Colesa .................... G06F 21/53 726/1 |
| 2020/0326972 | A1 | 10/2020 | Doane et al. |

FOREIGN PATENT DOCUMENTS

| | | |
|---|---|---|
| CN | 106105138 A | 11/2016 |
| EP | 1168166 A2 | 1/2002 |
| EP | 2241973 A2 | 10/2010 |
| EP | 3114813 A2 | 1/2017 |
| JP | 2002-014825 A | 1/2002 |
| JP | 2007-226277 A | 9/2007 |
| JP | 2010-176677 A | 8/2010 |
| JP | 2013-168117 A | 8/2013 |
| JP | 2013-176038 A | 9/2013 |
| JP | 2014-186747 A | 10/2014 |
| JP | 5945512 B2 | 7/2016 |
| JP | 6402198 B2 | 10/2018 |
| KR | 10-2010-0088846 A | 8/2010 |
| TW | 201335787 A | 9/2013 |
| WO | 2005/096121 A1 | 10/2005 |
| WO | 2015/134533 A2 | 9/2015 |

OTHER PUBLICATIONS

International Search Report and Written Opinion of PCT Application No. PCT/JP2018/048405, issued on Apr. 9, 2019, 07 pages of ISRWO.

* cited by examiner

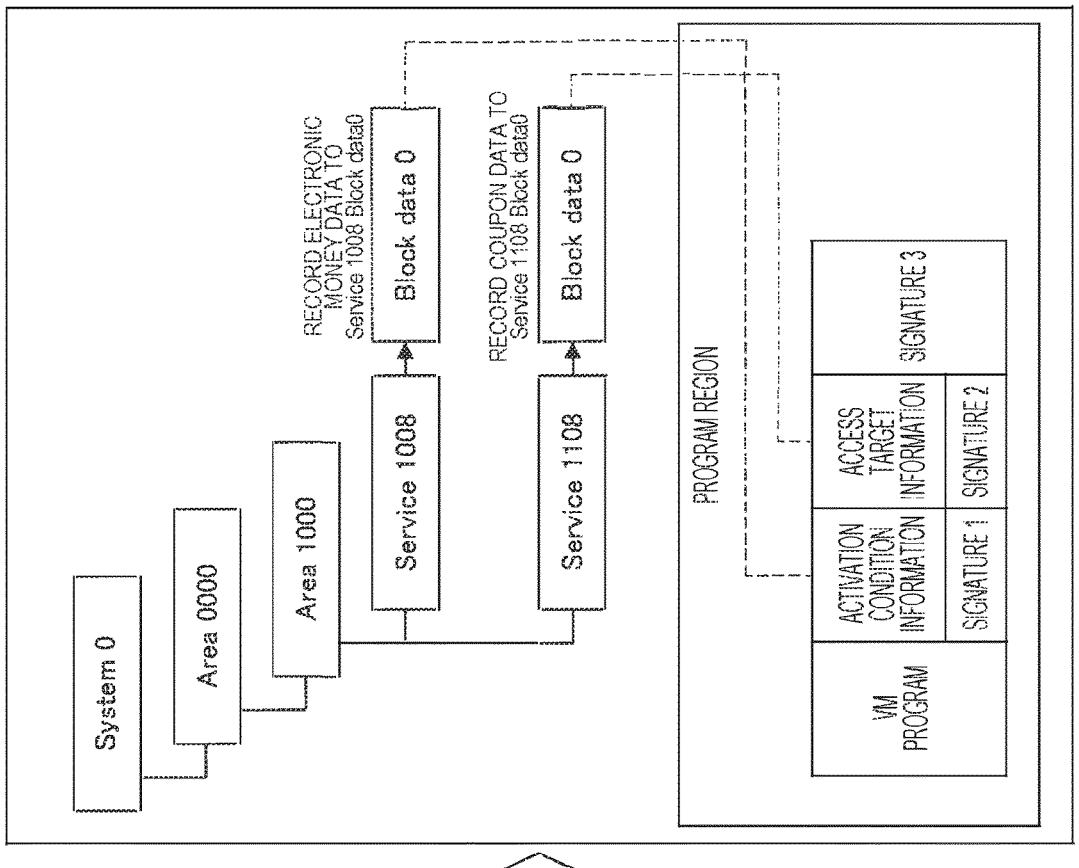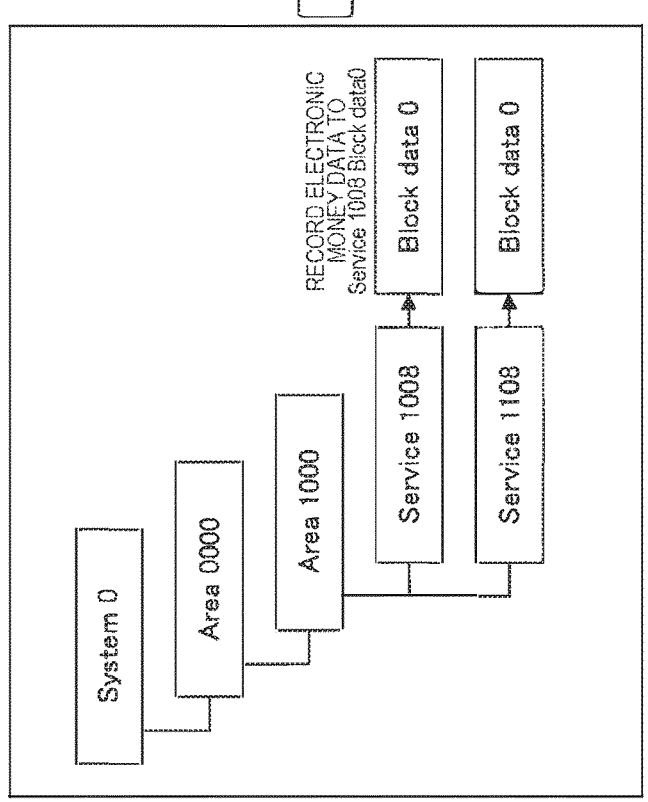

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/048405 filed on Dec. 28, 2018, which claims priority benefit of Japanese Patent Application No. JP 2018-020431 filed in the Japan Patent Office on Feb. 7, 2018. Each of the above-referenced applications is hereby incorporated herein by reference in its entirety.

TECHNICAL FIELD

The present disclosure relates to an information processing apparatus, an information processing method, and a program.

BACKGROUND ART

"A technology for incorporating an application program imitating another OS into a single Operating System (OS) and operating the other OS in an execution environment of the single OS" has been developed. As the technology described above, for example, a technology disclosed in Patent Document 1 below is exemplified.

Furthermore, "a technology regarding an OS that operates a plurality of applications on a manageable multi-platform and that can be activated in response to a command of the multi-platform" has been developed. As the technology described above, for example, a technology disclosed in Patent Document 2 below is exemplified.

Furthermore,

CITATION LIST

Patent Document

Patent Document 1: Japanese Patent Application Laid-Open No. 2014-186747
Patent Document 2: Japanese Patent Application Laid-Open No. 2013-168117

SUMMARY OF THE INVENTION

Problems to be Solved by the Invention

As a method for expanding a function of a device, for example, there is a method for operating a virtual machine (hereinafter, may be referred to as Virtual Machine ("VM")). The virtual machine according to the present embodiment is a virtual program execution environment. Hereinafter, there is a case where a computer program that operates the virtual machine, that is, a computer program that realizes processing in the virtual program execution environment is referred to as "a VM program".

The present disclosure proposes an information processing apparatus, an information processing method, and a program which are novel and improved and which can improve convenience of a device in which a virtual machine can operate.

Solutions to Problems

According to the present disclosure, an information processing apparatus is provided that includes a processing unit having a function for controlling execution of processing regarding a virtual machine, in which a virtual machine program that operates the virtual machine is associated with condition information that includes information indicating a region of a recording medium and indicates a condition under which the virtual machine is operated, a code of the virtual machine program, and a first electronic signature generated on the basis of the condition information, and the processing unit controls the execution of the processing regarding the virtual machine on the basis of a confirmation result of the first electronic signature associated with the virtual machine program.

Furthermore, according to the present disclosure, an information processing apparatus is provided that includes a processing unit having a function for operating a virtual machine and a function for writing data on the basis of a writing command acquired from an external device, in which a virtual machine program that operates the virtual machine is associated with condition information that includes information indicating a region of a recording medium and indicates a condition under which the virtual machine is operated, in a case where the writing command is acquired from an external device, the processing unit operates the virtual machine in a case where a region indicated by a parameter of the writing command is a region indicated by the condition information, determines whether or not all data writing performed on the basis of the writing command can be normally performed, writes data on the basis of the writing command when it is determined that all the data writing can be normally performed, does not write data on the basis of the writing command when it is not determined that all the data writing can be normally performed, and in a case where the virtual machine operates the virtual machine on the basis of the writing command, the data writing based on the writing command includes data writing performed by the virtual machine program.

Furthermore, according to the present disclosure, an information processing method is provided that is executed by an information processing apparatus and includes a step for controlling execution of processing regarding a virtual machine, in which a virtual machine program that operates the virtual machine is associated with condition information that includes information indicating a region of a recording medium and indicates a condition under which the virtual machine is operated, a code of the virtual machine program, and a first electronic signature generated on the basis of the condition information, and, in the controlling step, the execution of the processing regarding the virtual machine is controlled on the basis of a confirmation result of the first electronic signature associated with the virtual machine program.

Furthermore, according to the present disclosure, an information processing method executed by an information processing apparatus is provided that includes a step for operating a virtual machine and a step for writing data on the basis of a writing command acquired from an external device, in which a virtual machine program that operates the virtual machine is associated with condition information that includes information indicating a region of a recording medium and indicates a condition under which the virtual machine is operated, in a case where the writing command is acquired from the external device, in the step for operating the virtual machine, the virtual machine is operated in a case where a region indicated by a parameter of the writing command is a region indicated by the condition information, in the step for performing writing, it is determined whether or not all data writing performed on the basis of the writing command can be normally performed, data is written on the basis of the writing command when it is determined that all the data writing can be normally performed, data is not written on the basis of the writing command when it is not determined that all the data writing can be normally performed, and in a case where the virtual machine is operated by the step for operating the virtual machine, the data writing based on the writing command includes data writing performed by the virtual machine program.

Furthermore, according to the present disclosure, a program for causing a computer to realize a function for controlling execution of processing regarding a virtual machine is provided, in which a virtual machine program that operates the virtual machine is associated with condition information that includes information indicating a region of a recording medium and indicates a condition under which the virtual machine is operated, a code of the virtual machine program, and a first electronic signature generated on the basis of the condition information, and the controlling function controls the execution of the processing regarding the virtual machine on the basis of a confirmation result of the first electronic signature associated with the virtual machine program.

Furthermore, according to the present disclosure, a program for causing a computer to realize a function for operating a virtual machine and a function for writing data on the basis of a writing command acquired from an external device, in which a virtual machine program that operates the virtual machine is associated with condition information that includes information indicating a region of a recording medium and indicates a condition under which the virtual machine is operated, in a case where the writing command is acquired from an external device, the function for operating the virtual machine operates the virtual machine in a case where a region indicated by a parameter of the writing command is a region indicated by the condition information, the function for performing writing determines whether or not all data writing performed on the basis of the writing command can be normally performed, writes data on the basis of the writing command when it is determined that all the data writing can be normally performed, and does not write data on the basis of the writing command when it is not determined that all the data writing can be normally performed, and in a case where the function for operating the virtual machine operates the virtual machine on the basis of the writing command, the data writing based on the writing command includes data writing performed by the virtual machine program.

Effects of the Invention

According to the present disclosure, it is possible to improve convenience of a device in which a virtual machine can operate.

Note that the above effects are not necessarily limited, and any effect that has been described in the present specification or other effect which may be found from the present specification may be obtained together with or instead of the above effects.

BRIEF DESCRIPTION OF DRAWINGS

FIGS. 11A and 11B are explanatory diagrams for explaining a first example of a use case to which an information processing method according to the present embodiment is applied.

MODE FOR CARRYING OUT THE INVENTION

Figure 1:
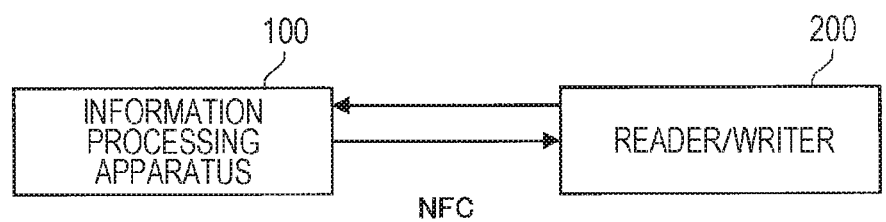
FIG. 1 is an explanatory diagram illustrating an exemplary configuration of an information processing system according to the present embodiment.

Hereinafter, preferred embodiments of the present disclosure will be described in detail with reference to the accompanying drawings. Note that, in the present specification and the drawings, components having substantially the same functional configuration are denoted with the same reference numeral so as to omit redundant description.

Furthermore, hereinafter, description will be made in the following order.
1. Information Processing System According to Present Embodiment And Information Processing Method According to Present Embodiment
    [1] Configuration of Information Processing System According to Present Embodiment
        [1-1] Information Processing Apparatus 100
        [1-2] Reader/writer 200
        [1-3] Application Example of Each Device Included in Information Processing System According to Present Embodiment

[2] Processing According to Information Processing Method According to Present Embodiment
 [2-1] Information Processing Method According to First Embodiment
 [2-2] Information Processing Method According to Second Embodiment
 [2-3] Information Processing Method According to Third Embodiment
 [2-4] Information Processing Method According to Fourth Embodiment
 [2-5] Information Processing Method According to Fifth Embodiment
 [2-6] Information Processing Method According to Other Embodiment
[3] Example of Effects Obtained by Using Information Processing Method According to Present Embodiment
[4] Use Cases to Which Information Processing Method According to Present Embodiment Is Applied
 [4-1] First Example of Use Case: Coupon Provision by VM
 [4-2] Second Example of Use Case: Electronic Money Using Limit Amount Setting by VM
2. Program According to Present Embodiment Information Processing System According to Present Embodiment and Information Processing Method According to Present Embodiment Hereinafter, an example of an information processing system according to the present embodiment will be described first. Thereafter, an information processing method according to the present embodiment will be described using a case where the information processing method is applied to the information processing system according to the present embodiment as an example.

Furthermore, hereinafter, a case where an information processing apparatus according to the present embodiment is an Integrated Circuit (IC) card will be mainly described as an example. Note that the information processing apparatus according to the present embodiment is not limited to the IC card. Another application example of the information processing apparatus according to the present embodiment will be described later.

[1] Configuration of Information Processing System According to Present Embodiment FIG. 1 is an explanatory diagram illustrating an example of a configuration of an information processing system 1000 according to the present embodiment. The information processing system 1000 includes, for example, an information processing apparatus 100 and a reader/writer 200.

Note that the configuration of the information processing system according to the present embodiment is not limited to the example illustrated in FIG. 1. For example, the information processing system according to the present embodiment may include the plurality of information processing apparatuses 100. Furthermore, the information processing system according to the present embodiment may include the plurality of reader/writers 200.

The information processing apparatus 100 and the reader/writer 200 communicate with each other by using Near Field Communication (NFC) of, for example, Type-A, Type-B, Type-F, or the like.

Note that, in the information processing system according to the present embodiment, the information processing apparatus 100 and the reader/writer 200 may communicate with each other, for example, through "wireless communication using arbitrary communication method, such as wireless communication using IEEE802.15.1 such as Bluetooth Low Energy (BLE), wireless communication using IEEE802.11, infrared communication, or the like" or "wired communication using communication via a Universal Serial Bus (USB) and a communication interface based on the ISO7816 standard, or the like".

[1-1] Information Processing Apparatus 100

Figure 2:
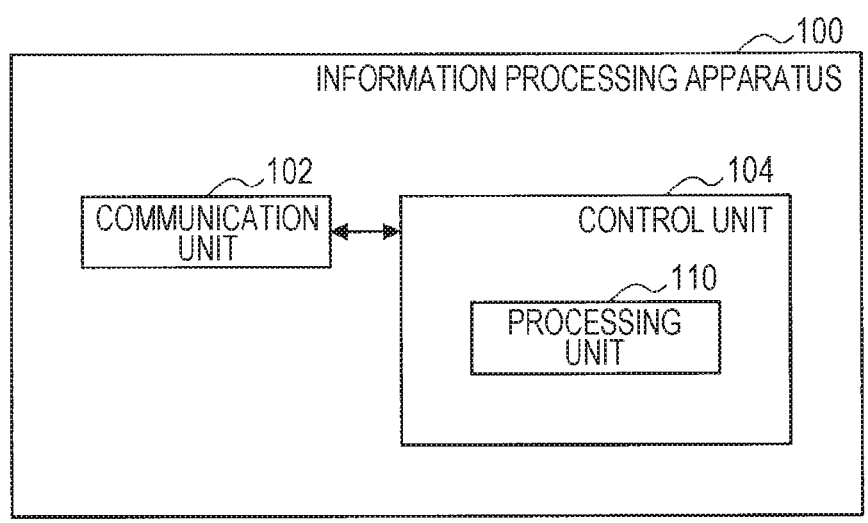
FIG. 2 is a functional block diagram illustrating an exemplary configuration of an information processing apparatus according to the present embodiment.

FIG. 2 is a functional block diagram illustrating an example of a configuration of the information processing apparatus 100 according to the present embodiment. The information processing apparatus 100 includes, for example, a communication unit 102 and a control unit 104.

[Exemplary Hardware Configuration of Information Processing Apparatus 100]

Figure 3:
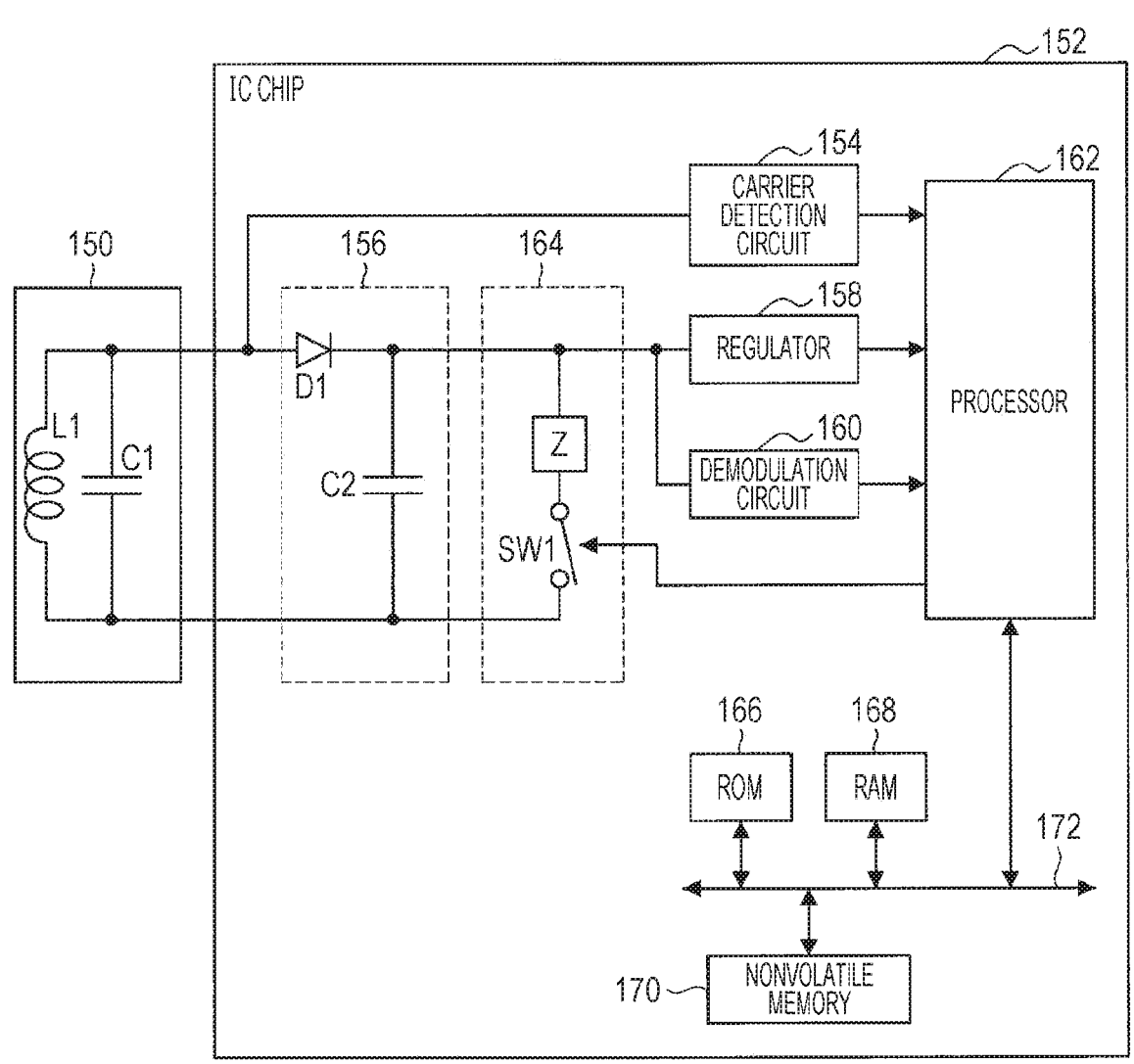
FIG. 3 is an explanatory diagram illustrating an exemplary hardware configuration of the information processing apparatus according to the present embodiment.

FIG. 3 is an explanatory diagram illustrating an exemplary hardware configuration of the information processing apparatus 100 according to the present embodiment. The information processing apparatus 100 includes, for example, an antenna 150 and an IC chip 152. Note that it is not necessary for the information processing apparatus 100 to have the configuration of the IC chip 152 illustrated in FIG. 3, for example, in a form of an IC chip.

The information processing apparatus 100 having the hardware configuration illustrated in FIG. 3 is driven by a reception voltage according to a carrier wave received by the antenna 150. Note that the information processing apparatus 100 can be driven by, for example, power supplied from an internal power supply such as a battery included in the information processing apparatus 100, power supplied from a connected external power supply, or the like.

The antenna 150 includes, for example, a resonator including a coil (inductor) L1 having a predetermined inductance and a capacitor C1 having a predetermined capacitance and generates an induced voltage by electromagnetic induction in response to the reception of the carrier wave. Then, the antenna 150 outputs a reception voltage obtained by resonating the induced voltage at a predetermined resonance frequency. Here, the resonance frequency of the antenna 150 is set in accordance with a frequency of the carrier wave, for example, 13.56 [MHz] or the like. With the above configuration, the antenna 150 receives the carrier wave and further transmits a response signal according to load modulation performed by a load modulation circuit 164 included in the IC chip 152.

The IC chip 152 includes, for example, a carrier detection circuit 154, a detection circuit 156, a regulator 158, a demodulation circuit 160, a processor 162, and the load modulation circuit 164. Note that, although not illustrated in FIG. 2, the IC chip 152 may further include, for example, a protection circuit (not illustrated) that prevents an overvoltage or an overcurrent from being applied to the processor 162. Here, as the protection circuit (not illustrated), for example, a clamp circuit including a diode or the like is exemplified.

Furthermore, the IC chip 152 includes, for example, a Read Only Memory (ROM) 166, a Random Access Memory (RAM) 168, and a nonvolatile memory 170. The processor 162, the ROM 166, the RAM 168, and the nonvolatile memory 170 are connected, for example, by a bus 172 as a data transmission path.

The ROM 166 stores control data such as a program to be executed by the processor 162 or a calculation parameter.

The RAM 168 temporarily stores the program to be executed by the processor 162, a calculation result, an execution state, or the like. Furthermore, in a case where the program to be executed by the processor 162 is a VM program, the RAM 168 temporarily stores a program to be executed by the VM program, a calculation result, an execution state, or the like.

The nonvolatile memory 170 stores various data, for example, "data according to the information processing method according to the present embodiment such as the VM program or a key", an electronic value (data having money or value equivalent to money, may be referred to as "electronic money" below), data corresponding to various services, various application programs, or the like. The key according to the present embodiment is data used for, for example, confirmation of an electronic signature, authentication in communication using an arbitrary communication method such as the NFC (including authentication performed to access region of recording medium), arbitrary encryption, processing related to decryption, or the like.

Here, as the nonvolatile memory 170, for example, an Electrically Erasable and Programmable Read Only Memory (EEPROM), a flash memory, or the like are exemplified.

Furthermore, the nonvolatile memory 170 has, for example, tamper resistant. By storing various data such as the VM program in a secure recording medium having tamper resistant such as the nonvolatile memory 170, security of data is ensured in the information processing apparatus 100.

The carrier detection circuit 154 generates, for example, a rectangular detection signal on the basis of the reception voltage transmitted from the antenna 150 and transmits the detection signal to the processor 162. Furthermore, the processor 162 uses the transmitted detection signal, for example, as a processing clock for data processing. Here, since the detection signal is based on the reception voltage transmitted from the antenna 150, the detection signal is synchronized with a frequency of a carrier wave transmitted from an external device such as the reader/writer 200. Therefore, the IC chip 152 includes the carrier detection circuit 154 so as to execute the processing with the external device such as the reader/writer 200 in synchronization with the external device.

The detection circuit 156 rectifies the reception voltage output from the antenna 150. Here, the detection circuit 156 includes, for example, a diode D1 and a capacitor C2.

The regulator 158 smooths and stabilizes the reception voltage and outputs a driving voltage to the processor 162. Here, the regulator 158 uses a DC component of the reception voltage as the driving voltage. Note that, as described above, for example, in a case where the information processing apparatus 100 includes the internal power supply such as a battery or in a case where the information processing apparatus 100 is connected to the external power supply, the information processing apparatus 100 can be driven by power supplied from the internal power supply or power supplied from the external power supply.

The demodulation circuit 160 demodulates a carrier wave signal included in the carrier wave on the basis of the reception voltage and outputs data corresponding to the carrier wave signal (for example, binary data signal of high level and low level). Here, the demodulation circuit 160 outputs an AC component of the reception voltage as data.

The processor 162 is driven, for example, by using the driving voltage output from the regulator 158 as a power supply and processes data demodulated by the demodulation circuit 160.

The processor 162 processes the data, for example, by executing a native code. The native code according to the present embodiment is a code that can be executed by an arbitrary processor included in the information processing apparatus 100, such as the processor 162. Since the native code is executed by the processor included in the information processing apparatus 100, the native code operates at a processing speed of the processor.

Furthermore, for example, in a case where the processor 162 executes the VM program, the data processing described above may be executed by the VM program.

Furthermore, the processor 162 selectively generates a control signal used to control the load modulation regarding a response to the external device such as the reader/writer 200, according to the processing result. Then, the processor 162 selectively outputs the control signal to the load modulation circuit 164.

Note that the processing by the processor 162 is not limited to the processing on the data demodulated by the demodulation circuit 160. For example, the processor 162 can execute arbitrary data processing by the executed VM program or by executing the native code.

The processor 162 includes one or two or more processors, various processing circuits, or the like each including a calculation circuit, for example, a Micro Processing Unit (MPU) or the like.

The load modulation circuit 164 includes, for example, a load Z and a switch SW1 and performs the load modulation for selectively connecting (validating) the load Z in accordance with the control signal transmitted from the processor 162. Here, the load Z includes, for example, a resistor having a predetermined resistance value. Furthermore, the switch SW1 includes, for example, a p-channel Metal Oxide Semiconductor Field effect transistor (MOSFET) and an n-channel MOSFET.

For example, with the above configuration, the IC chip 152 can process the carrier wave signal received by the antenna 150 and make the antenna 150 transmit the response signal according to the load modulation. Furthermore, for example, with the configuration described above, the IC chip 152 can execute arbitrary data processing by the executed VM program or by executing the native code.

Note that the hardware configuration of the information processing apparatus according to the present embodiment is not limited to the configuration illustrated in FIG. 3. For example, the information processing apparatus according to the present embodiment can have a configuration according to an application example of the information processing apparatus according to the present embodiment to be described later.

With reference to FIG. 2 again, an example of the configuration of the information processing apparatus 100 will be described. The communication unit 102 is a communication unit included in the information processing apparatus 100 and communicates with an external device. Communication of the communication unit 102 is controlled by the control unit 104, for example.

Here, as the communication unit 102, for example, the antenna 150 and the IC chip 152 illustrated in FIG. 3 are exemplified. In a case where the communication unit 102 includes the antenna 150 and the IC chip 152, the information processing apparatus 100 performs non-contact communication by the NFC defined by ISO/IEC18092 with the external device such as the reader/writer 200 by using a carrier wave having a predetermined frequency of, for example, 13.56 [MHz] or the like.

Note that the communication unit 102 is not limited to the antenna 150 and the IC chip 152. For example, the communication unit 102 includes a communication device that is compatible with an arbitrary communication method, such as an IEEE802.15.1 port and a transmission and reception circuit, an IEEE802.11 port and a transmission and reception circuit, or the like. Furthermore, the communication unit 102 may have a configuration that can communicate with, for example, one or two or more external devices by using a plurality of communication methods.

For example, the control unit 104 serves to control the entire information processing apparatus 100. Furthermore, the control unit 104 includes, for example, a processing unit 110 and plays a leading role for executing the processing according to the information processing method according to the present embodiment to be described later.

The processing unit 110 plays a leading role for executing the processing according to the information processing method by the information processing apparatus 100. An example of the processing according to the information processing method by the information processing apparatus 100 will be described in each embodiment below.

Note that the configuration of the information processing apparatus according to the present embodiment is not limited to the configuration illustrated in FIG. 2.

For example, the information processing apparatus according to the present embodiment can separately include the processing unit 110 illustrated in FIG. 2 from the control unit 104 (for example, to realize by another processing circuit).

Furthermore, the configuration of the information processing apparatus according to the present embodiment is not limited to the configuration illustrated in FIG. 2, and the information processing apparatus can have an arbitrary configuration according to how to divide the processing according to the information processing method by the information processing apparatus 100 to be described later.

Furthermore, for example, in a case where the information processing apparatus according to the present embodiment operates standalone or in a case where the information processing apparatus communicates with an external device via an external communication device having a function and a configuration similar to those of the communication unit 102, it is not necessary for the information processing apparatus according to the present embodiment to include the communication unit 102.

[1-2] Reader/Writer 200

The reader/writer 200 is an example of a device that can communicate with the information processing apparatus 100. The reader/writer 200 may serve as a relay device that relays communication between the information processing apparatus 100 and other devices.

[Exemplary Hardware Configuration of Reader/Writer 200]

Figure 4:
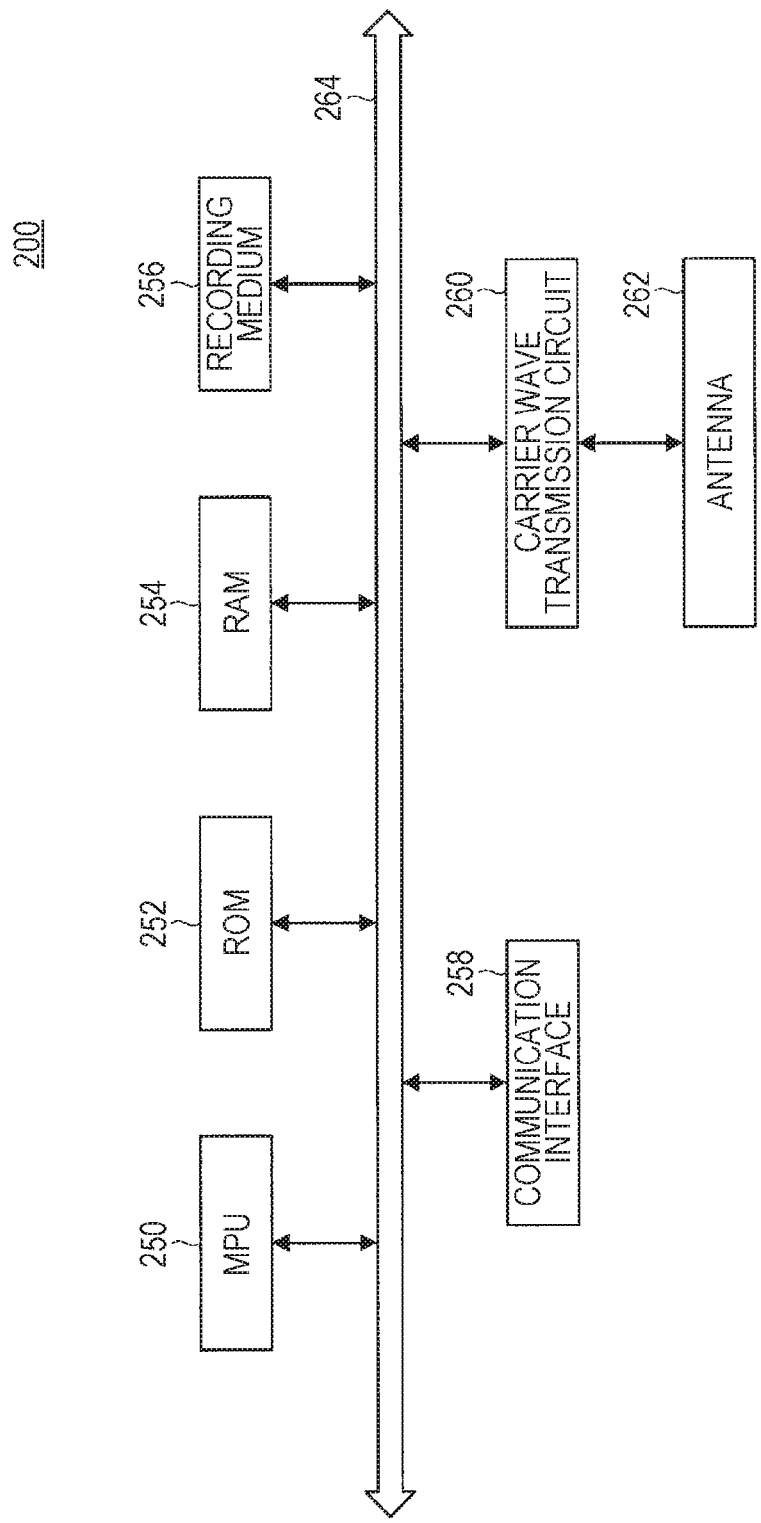
FIG. 4 is an explanatory diagram illustrating an exemplary hardware configuration of a reader/writer according to the present embodiment.

FIG. 4 is an explanatory diagram illustrating an exemplary hardware configuration of the reader/writer 200 according to the present embodiment.

The reader/writer 200 includes, for example, an MPU 250, a ROM 252, a RAM 254, a recording medium 256, a communication interface 258, a carrier wave transmission circuit 260, and an antenna 262. Furthermore, the reader/writer 200 connects between the components, for example, by a bus 264 as a data transmission path. Furthermore, the reader/writer 200 is driven by, for example, power supplied from an internal power supply such as a battery included in the reader/writer 200, power supplied from a connected external power supply, or the like.

The MPU 250 includes one or two or more processors, various processing circuits, or the like each including a calculation circuit, for example, an MPU or the like and functions as a control unit (not illustrated) that controls the entire reader/writer 200.

The ROM 252 stores control data such as a program to be executed by the MPU 250, a calculation parameter, or the like. The RAM 254 temporarily stores, for example, a program to be executed by the MPU 250 or the like.

The recording medium 256 functions as a storage unit (not illustrated) and stores various data, for example, various applications or the like. Here, as the recording medium 256, for example, a magnetic recording medium such as a hard disk and a nonvolatile memory such as a flash memory are exemplified. Furthermore, the recording medium 256 may be detachable from the reader/writer 200.

The communication interface 258 is a communication unit that is included in the reader/writer 200 and performs communication using a single communication method, and functions as a first communication unit (not illustrated) that wirelessly or wiredly communicates with an external device such as the server via a network (or directly). Here, as the communication interface 258, for example, a communication antenna and an RF circuit (wireless communication), an IEEE802.15.1 port and a transmission and reception circuit (wireless communication), an IEEE802.11 port and a transmission and reception circuit (wireless communication), a LAN terminal and a transmission and reception circuit (wired communication), or the like are exemplified. Furthermore, the communication interface 258 may have an arbitrary configuration compatible with the network according to the present embodiment.

The carrier wave transmission circuit 260 and the antenna 262 are communication units that are included in the reader/writer 200 and perform communication using other communication method and function as a second communication unit (not illustrated) that wirelessly or wiredly communicates with the external device such as the information processing apparatus 100.

The antenna 262 includes, for example, a resonator that includes a coil having a predetermined inductance as a transmission/reception antenna and a capacitor having a predetermined capacitance and a demodulation circuit. Then, by receiving a carrier wave having a predetermined frequency, for example, 13.56 [MHz] or the like, the antenna 262 demodulates, for example, data transmitted from the external device such as the information processing apparatus 100 by the load modulation or the like. Note that, for example, in a case where the carrier wave transmission circuit 260 includes the demodulation circuit, the antenna 262 may include the resonator.

The carrier wave transmission circuit 260 includes, for example, a modulation circuit that performs modulation such as Amplitude Shift Keying (ASK) and an amplification circuit that amplifies an output of the modulation circuit and transmits a carrier wave on which a carrier wave signal is applied from the transmission/reception antenna of the antenna 262. Furthermore, the carrier wave transmission circuit 260 may include, for example, a demodulation circuit that demodulates the signal received by the antenna 262. The demodulation circuit demodulates, for example, the signal received by the antenna 262 by performing envelope detection on an amplitude change of a voltage between the modulation circuit (or amplification circuit) and the resonator of the antenna 262 and binarizing the detected signal. Note that the demodulation circuit can demodulate the signal received by the antenna 262, for example, by using a phase change of the voltage between the modulation circuit (or amplification circuit) and the resonator of the antenna 262.

By including the carrier wave transmission circuit 260, the reader/writer 200 has an initiator function in the NFC and serves as a so-called reader/writer. Here, as the carrier wave signal transmitted by the carrier wave transmission circuit 260 from the antenna 262, for example, various signals such as a polling signal, a signal indicating various commands such as a writing command, or the like are exemplified. As the writing command according to the present embodiment, for example, data including a data writing command and various parameters indicating a writing target region or the like is exemplified. Furthermore, the writing command may include data to be written.

Furthermore, in the carrier wave transmission circuit 260, for example, transmission of the carrier wave is controlled by the MPU 250.

The reader/writer 200 has, for example, a hardware configuration illustrated in FIG. 4. Note that the hardware configuration of the reader/writer 200 according to the present embodiment is not limited to the configuration illustrated in FIG. 4.

For example, in a case where communication with an external device is performed via an external communication device having a function similar to that of the communication interface 258, it is not necessary for the reader/writer 200 to include the communication interface 258.

Furthermore, in a case where communication with an external device is performed via an external communication device having a function similar to those of the carrier wave transmission circuit 260 and the antenna 262, it is not necessary for the reader/writer 200 to include the carrier wave transmission circuit 260 and the antenna 262.

Furthermore, in a case where communication with an external device is performed by using a communication method other than the NFC such as wireless communication using IEEE802.15.1, it is not necessary for the reader/writer 200 to include the carrier wave transmission circuit 260 and the antenna 262. In the above case, the reader/writer 200 communicates with the external device by including the communication device compatible with the communication method other than the NFC or by using the external communication device compatible with the communication method other than the NFC.

Furthermore, the reader/writer 200 can have, for example, a configuration that does not include the recording medium 256.

Furthermore, the reader/writer 200 can have a hardware configuration, for example, according to an application example of the reader/writer 200 to be described later.

Furthermore, for example, the configuration (or configuration according to modification) illustrated in FIG. 4 may be realized by one or two or more ICs.

[1-3] Application Example of Each Device Included in Information Processing System According to Present Embodiment In the above, the information processing apparatus 100 has been described as a component of the information processing system according to the present embodiment, and a case where the information processing apparatus 100 is an IC card has been described as an example. However, the application example of the information processing apparatus according to the present embodiment is not limited to the example described above. The information processing apparatus according to the present embodiment can be applied to various apparatuses that can execute the processing according to the information processing method by the information processing apparatus 100 to be described later, for example, "a computer such as a Personal Computer (PC) and a server", "a tablet device", "a game machine", "an arbitrary Internet of Things (IoT) apparatus", or the like. Furthermore, the information processing apparatus according to the present embodiment can be applied to, for example, an IC that can be incorporated into the above apparatus such as "a Subscriber Identity Module (SIM)", "eUICC", "eSE", "Trusted Execution Environment (TEE)", or the like.

Furthermore, the reader/writer 200 has been described as an example of the component of the information processing system according to the present embodiment. However, the present embodiment is not limited to the form. The present embodiment can be applied to any apparatus that can communicate with the information processing apparatus according to the present embodiment, for example, "a reader/writer", "a device having a reader/writer function", "a communication device that performs communication by wireless communication using IEEE802.15.1 such as BLE or the like", or the like. Furthermore, the present embodiment can be applied to, for example, a processing IC that can be incorporated into the apparatus described above.

[2] Information Processing Method According to Present Embodiment

Next, the processing according to the information processing method according to the present embodiment will be described using the information processing system 1000 illustrated in FIG. 1 as an example.

As described above, methods for expanding a function of the device include, for example, a method for operating a VM. The information processing apparatus 100 to which the information processing method according to the present embodiment is applied is an apparatus to which the method for operating the VM is applied.

Figure 5:
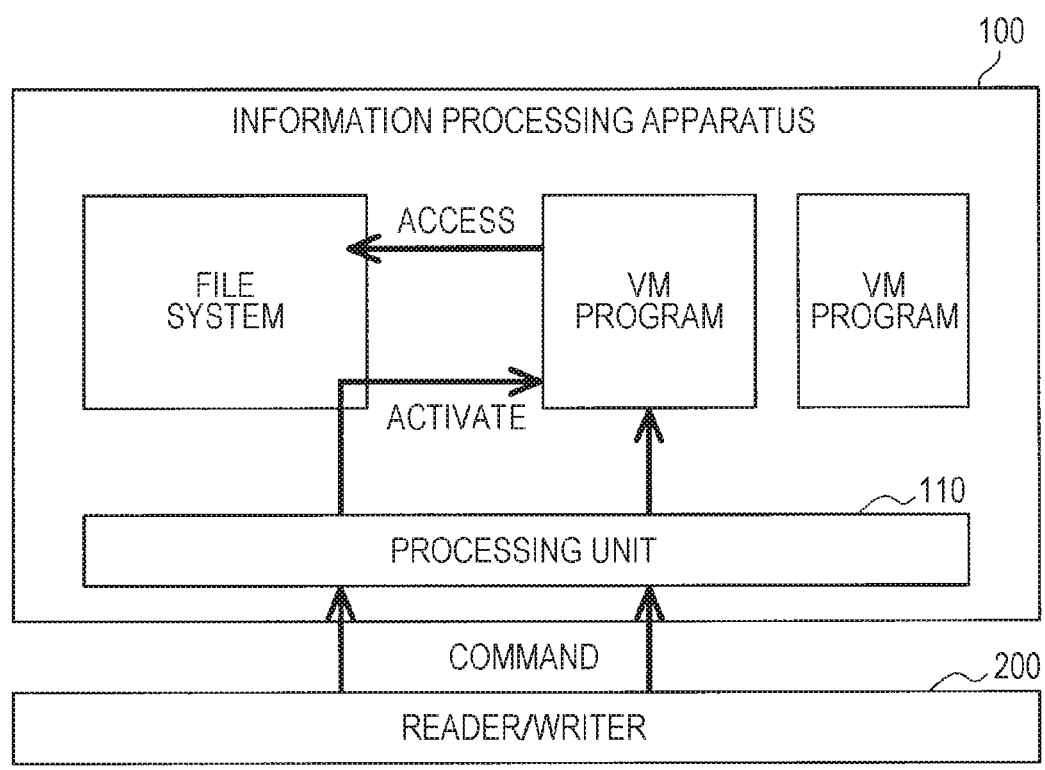
FIG. 5 is an explanatory diagram for explaining an example of an operation of a virtual machine (VM) in the information processing apparatus according to the present embodiment.

FIG. 5 is an explanatory diagram for explaining an example of an operation of a virtual machine (VM) in the information processing apparatus 100 according to the present embodiment. In FIG. 5, the information processing apparatus 100 and the reader/writer 200 illustrated in FIG. 1 are illustrated.

One or a plurality of VM programs may be installed in the information processing apparatus 100. Here, to install the VM program means, for example, that "the VM program is stored in a recording medium accessible by the processor (for example, processor that functions as processing unit 110) included in the information processing apparatus 100 and the processor is in a state where the processor can execute the VM program".

Here, the VM program can be the same regardless of the architecture of the processor included in the apparatus, for example. Therefore, it is possible to operate the single VM program by a plurality of types of apparatuses.

The VM program may be installed by not only a manufacturer of the information processing apparatus 100 but also a user of the information processing apparatus 100.

For example, as illustrated in FIG. 5, the VM program is activated when the information processing apparatus 100 receives a specific command or when a specific access is made to a file system in a process of processing on the received command. A trigger that activates the VM program is defined, for example, by condition information associated with the VM program (to be described later). By activating the VM program, the VM corresponding to the VM program operates.

As the file system according to the present embodiment, for example, an arbitrary file system compatible with an OS that operates in the information processing apparatus 100 such as a file system of a Felica (registered trademark) OS is exemplified.

The activated VM program executes various processing, for example, "to make an arbitrary access to the file system", "to stop processing related to an operation that is originally performed by a command and execute processing related to other operation instead", or the like.

Figure 6:
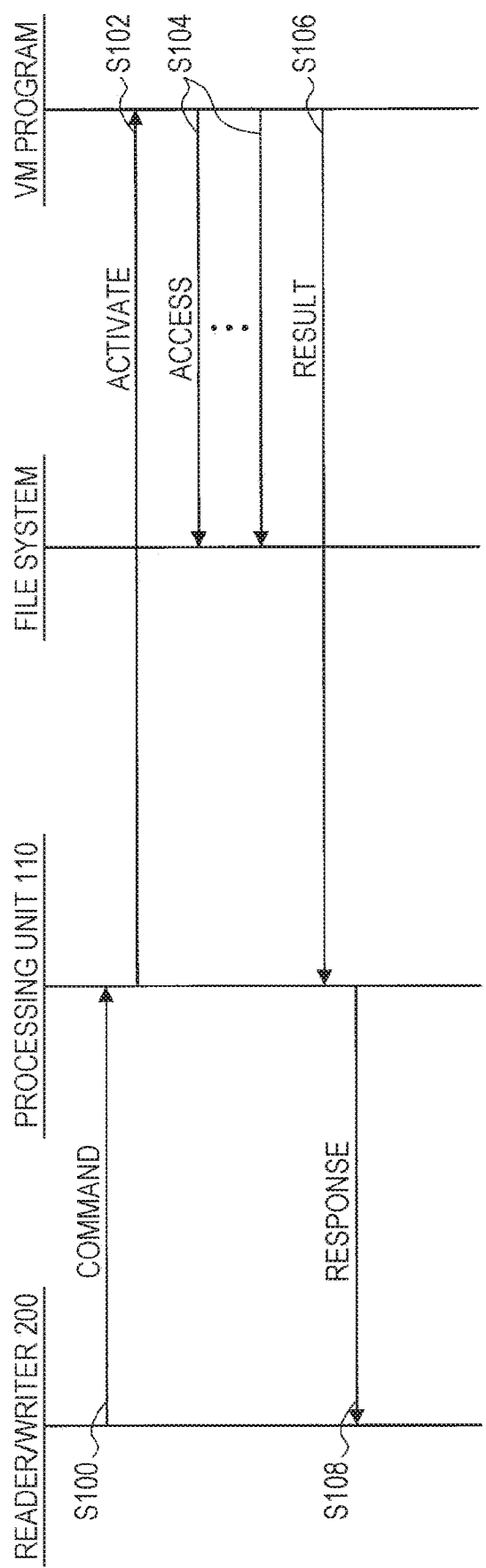
FIG. 6 is an explanatory diagram for explaining an example of the operation of the virtual machine (VM) in the information processing apparatus according to the present embodiment.

FIG. 6 is an explanatory diagram for explaining an example of the operation of the virtual machine (VM) in the information processing apparatus 100 according to the present embodiment. FIG. 6 illustrates an example of processing by the information processing apparatus 100 and the reader/writer 200 illustrated in FIG. 1.

The reader/writer 200 transmits a command such as a writing command or a reading command for reading data (S100).

In a case where it is determined that the condition for operating the virtual machine indicated by the condition information is satisfied, the processing unit 110 of the information processing apparatus 100 that has received the command transmitted from the reader/writer 200 in step S100 activates the VM program (S102).

The condition information according to the present embodiment is data indicating a condition under which the virtual machine is operated and includes, for example, information indicating a region of a recording medium such as a parameter of the region of the recording medium as a condition. As the condition information, for example, activation condition information that uses reception of a specific command as an activation trigger and access target information that uses a specific access to the file system as the activation trigger are exemplified.

The activation condition information includes, for example, information indicating the VM program to be activated (for example, ID of VM program or the like), information defining a command to be a trigger of activation of the VM program (for example, command code or the like), and information indicating the region of the recording medium (for example, data indicating address or the like). Furthermore, the access target information includes, for example, information indicating the VM program to be activated (for example, ID of VM program or the like) and information that indicates the region of the recording medium and defines the access to be the trigger of the activation of the VM program (for example, data indicating address or the like).

For example, by activating the VM program on the basis of the condition information, the activation of the VM program is realized when the information processing apparatus 100 receives the specific command or when the specific access is made to the file system in the process of the processing on the received command.

The VM program that has been activated by the processing in step S102 executes processing according to a code of the VM program and, for example, appropriately accesses the file system (S104) and transmits the processing result to the processing unit 110 (S106).

The processing unit 110 that has acquired the processing result from the VM program in step S106 transmits a response signal to the command in step S100 (S108).

For example, as illustrated in FIG. 6, in the information processing apparatus 100, the VM program is activated and the VM operates when the condition indicated by the condition information is satisfied. Note that it goes without saying that the example of the operation of the VM in the information processing apparatus 100 is not limited to the example illustrated in FIG. 6.

Hereinafter, an example of the processing according to the information processing method according to the present embodiment will be described for each embodiment.

[2-1] Information Processing Method According to First Embodiment

[2-1-1] Outline of Information Processing System 1000 to which Information Processing Method According to First Embodiment is Applied For example, a device such as an IC card includes a plurality of pieces of data, of which owners and access authorities are different from each other, in general.

In a case where the VM program is activated and the VM program is made to access the file system as indicated with reference to FIGS. 5 and 6, it is considered that it is necessary to limit the condition under which the VM program is activated and the access authority by the VM program. The reason why the limitation is needed is, for example, "because the VM program can change processing of an arbitrary command and a behavior of the file system and there is a possibility that the VM program can access any data in the file system in a case where no limitation is applied".

Here, as a method for limiting the condition under which the VM program is activated and the access authority by the VM program, "a method for storing a key for access in the VM program and performing an access after mutual authentication to the file system by the VM program similarly to the access to the file system by the external device such as the reader/writer 200" is considered. However, in a case where the method for storing the key for access in the VM program is used, there is a risk that the key for access is leaked from the VM program, and the above method is not desirable from the viewpoint of security.

Therefore, in the information processing system 1000 to which the information processing method according to the first embodiment is applied, the electronic signature is given to the VM program. Hereinafter, there is a case where an electronic signature given to the single VM program is referred to as "a first electronic signature".

The first electronic signature is generated, for example, on the basis of the code of the VM program, the condition information corresponding to the VM program, and the key corresponding to the condition information. The first electronic signature may be generated by an arbitrary external device of the information processing apparatus 100 such as a server (not illustrated).

The first electronic signature may be, for example, a public key type electronic signature or may be a common key type electronic signature. In a case where the first electronic signature is the common key type electronic signature, the first electronic signature is a Message Authentication Code (MAC).

In the information processing apparatus 100, by an arbitrary association method such as association using the ID of the VM program, the condition information and the first electronic signature are associated with the VM program and are stored in the recording medium. The condition information and the first electronic signature are transmitted to the information processing apparatus 100, for example, "when the VM program is transmitted from the external device of the information processing apparatus 100 such as the reader/writer 200 to the information processing apparatus 100". Furthermore, the condition information and the first electronic signature may be transmitted to the information processing apparatus 100 "at an arbitrary timing after the VM program is transmitted from the external device such as the reader/writer 200 to the information processing apparatus 100".

The information processing apparatus 100 confirms the first electronic signature associated with the VM program "when the installation of the VM is performed" or "after the installation of the VM is performed and before the VM operates". The confirmation of the first electronic signature corresponds to the verification of the first electronic signature, and the first electronic signature is confirmed by arbitrary processing that can verify the electronic signature.

Then, the information processing apparatus 100 controls execution of the processing regarding the VM (processing regarding virtual machine, the same applies below) on the basis of the confirmation result of the first electronic signature. The processing regarding the VM according to the present embodiment includes, for example, one of or both of the processing for installing the VM and the processing for operating the VM on the basis of the condition information.

As an example, in a case where the confirmation result of the first electronic signature indicates that the first electronic signature is not a correct signature, the information processing apparatus 100 executes predetermined error processing such as to cause the VM installation to fail, to invalidate the VM program, or invalidate the condition indicated by the condition information corresponding to the VM program. Furthermore, as another example, in a case where the confirmation result of the first electronic signature indicates that the first electronic signature is a correct signature, the information processing apparatus 100 can execute the processing regarding the VM such as to install the VM or to operate the VM on the basis of the condition information.

Note that "the first electronic signature associated with the VM program" or "the first electronic signature and the condition information associated with the VM program" may be discarded after confirming the first electronic signature. By discarding the first electronic signature or the like after confirming the first electronic signature, for example, "effects such that the recording medium included in the information processing apparatus 100 can be more efficiently used and the VM program can be safely executed" are obtained.

Figure 7B:
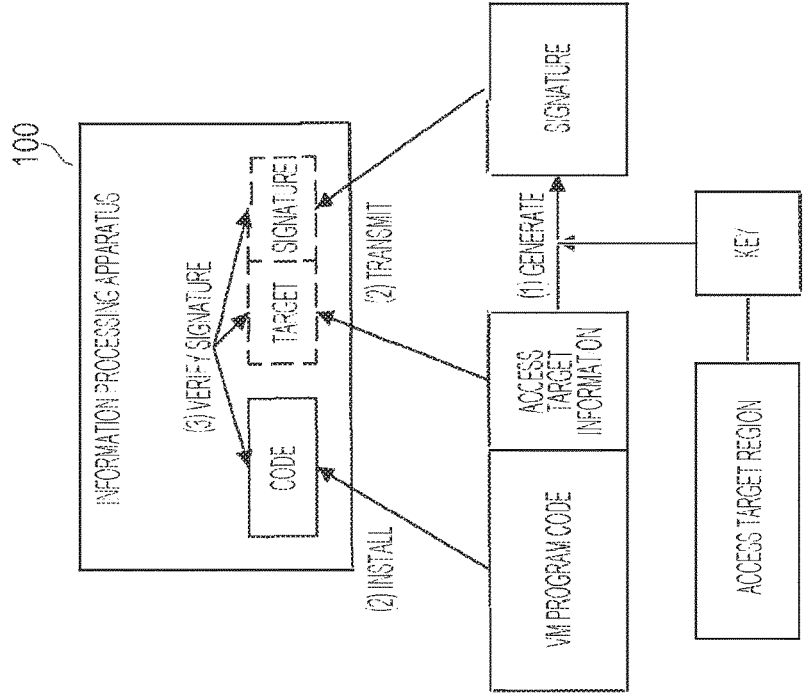
FIGS. 7A and 7B are explanatory diagrams for explaining an outline of an information processing method according to a first embodiment.
Figure 7A:
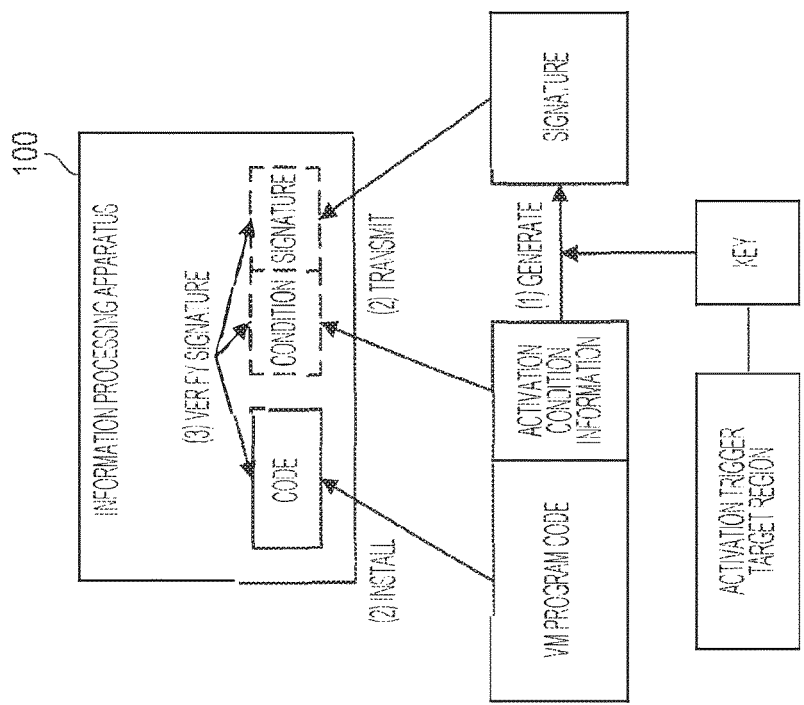

FIGS. 7A and 7B are explanatory diagrams for explaining an outline of the information processing method according to the first embodiment. FIG. 7A illustrates an example of a case where the condition information is the activation condition information, and FIG. 7B illustrates an example of a case where the condition information is the access target information. In FIGS. 7A and 7B, a first electronic signature is indicated as "a signature" (the same applies to other drawings).

As illustrated in FIGS. 7A and 7B, in the information processing system 1000 to which the information processing method according to the first embodiment is applied, the first electronic signature is generated from the code of the VM program, the condition information corresponding to the VM program (activation condition information illustrated in FIG. 7A or access target information illustrated in FIG. 7B), and the key associated with the condition information (key associated with "activation trigger target region" illustrated in FIG. 7A or key associated with "access target region" illustrated in FIG. 7B).

Furthermore, in the information processing apparatus 100, the condition information and the first electronic signature are associated with the VM program and are stored in the recording medium.

The information processing apparatus 100 confirms the first electronic signature associated with the VM program, for example, "when the installation of the VM is performed" or "after the installation of the VM is performed and before the VM operates". Then, the information processing apparatus 100 controls the execution of the processing regarding the VM on the basis of the confirmation result of the first electronic signature.

For example, as described above, "the information processing apparatus 100 confirms the first electronic signature associated with the VM program and controls the execution of the processing regarding the VM on the basis of the confirmation result" so that "to limit the condition under which the VM program activates and the access authority by the VM program" described above can be realized.

Furthermore, in a case where the information processing apparatus 100 controls the execution of the processing regarding the VM on the basis of the confirmation result of the first electronic signature, there is no risk that the key for access is leaked from the VM program as in a case where "the method for storing the key for access in the VM program" is used. Therefore, the security is sufficiently ensured.

Therefore, the information processing apparatus 100 to which the information processing method according to the first embodiment is applied can improve convenience of the information processing apparatus 100 (example of device in which VM can operate).

[2-1-2] Processing According to Information Processing Method by Information Processing Apparatus 100 According to First Embodiment Next, an example of processing according to the information processing method by the information processing apparatus 100 according to the first embodiment will be described.

The information processing apparatus 100 controls the execution of the processing regarding the VM on the basis of the confirmation result of the first electronic signature.

The information processing apparatus 100 confirms the first electronic signature by using a key associated with a region indicated by the condition information.

The information processing apparatus 100 specifies the key associated with the region indicated by the condition information, for example, on the basis of setting information associated with the region of the recording medium. As the setting information, for example, "a table (or database) in which an address and the key indicating the region of the recording medium are recorded for each region in association with each other" is exemplified. Note that the setting information according to the present embodiment is not limited to the table (or database) as indicated above and may be data in an arbitrary format, for example, data for each region or the like.

The information processing apparatus 100 generates an electronic signature for verification, for example, from the code of the VM program, the condition information, and the key associated with the region indicated by the condition information. Then, the information processing apparatus 100 confirms validity of the first electronic signature by comparing the generated electronic signature for verification with the first electronic signature. To confirm the validity of the first electronic signature according to the present embodiment means to confirm whether or not the first electronic signature is a correct signature.

In a case where the electronic signature for verification and the first electronic signature coincide with each other, the information processing apparatus 100 determines that the first electronic signature is a correct signature (that is, determine that validity of first electronic signature has been confirmed). Furthermore, in a case where the electronic signature for verification and the first electronic signature do not coincide with each other, the information processing apparatus 100 does not determine that the first electronic signature is the correct signature (that is, does not determine that validity of first electronic signature has been confirmed).

Note that the processing regarding the confirmation of the first electronic signature is not limited to the example described above, and the information processing apparatus 100 may confirm the first electronic signature by arbitrary processing that can verify the electronic signature.

In a case where the validity of the first electronic signature has been confirmed, the information processing apparatus 100 can execute the processing regarding the virtual machine. As an example, in a case where the validity of the first electronic signature has been confirmed, the information processing apparatus 100 installs the VM or operates the VM on the basis of the condition information.

Furthermore, in a case where the validity of the first electronic signature has not been confirmed, the information processing apparatus 100 executes the predetermined error processing. As an example, in a case where the validity of the first electronic signature has not been confirmed, the information processing apparatus 100 makes the installation of the VM fail, invalidates the VM program, or invalidates the condition indicated by the condition information corresponding to the VM program. Note that the predetermined error processing according to the present embodiment is not limited to the example described above, and may be arbitrary processing that can realize that the VM is not operated.

[2-2] Information Processing Method According to Second Embodiment

By applying the information processing method according to the first embodiment described above, it is possible to improve the convenience of the information processing apparatus 100 (example of device in which VM can operate).

Here, a case is assumed where a first electronic signature associated with a VM program is generated for each region indicated by condition information, as the number of regions indicated by the condition information increases, the number of first electronic signatures increases. Therefore, as the number of regions indicated by the condition information increases, a time required for transmission when the first electronic signature is transmitted to the information processing apparatus 100 becomes longer, and a storage capacity of a recording medium of the information processing apparatus 100 that stores the first electronic signature increases. For example, in a case where the information processing apparatus 100 is an IC card, the storage capacity of the recording medium is not very large. Therefore, an increase in the storage capacity used to store the first electronic signature is not preferable.

Therefore, an information processing system 1000 to which the information processing method according to the second embodiment is applied prevents an increase in the number of electronic signatures associated with the VM program in a case where a plurality of pieces of condition information is associated with the VM program.

(A) First Example of Information Processing Method According to Second Embodiment In a case where the plurality of pieces of condition information is associated with the VM program, a degeneration key (new key) is generated from a plurality of keys respectively corresponding to the plurality of pieces of condition information. The degeneration key may be generated by an arbitrary external device of the information processing apparatus 100 such as a server (not illustrated).

The degeneration key is generated, for example, by sequentially encrypting an original value of a random number or the like by using the plurality of keys respectively corresponding to the plurality of pieces of condition information. Note that it goes without saying that the method for generating the degeneration key is not limited to the example described above.

Then, the first electronic signature is generated on the basis of a code of the VM program, the plurality of pieces of condition information, and the generated degeneration key. As described above, the first electronic signature may be generated by an arbitrary external device of the information processing apparatus 100 such as a server (not illustrated).

The information processing apparatus 100 controls execution of processing regarding the VM on the basis of the confirmation result of the first electronic signature as in a case where the information processing method according to the first embodiment described above is used.

Figure 8:
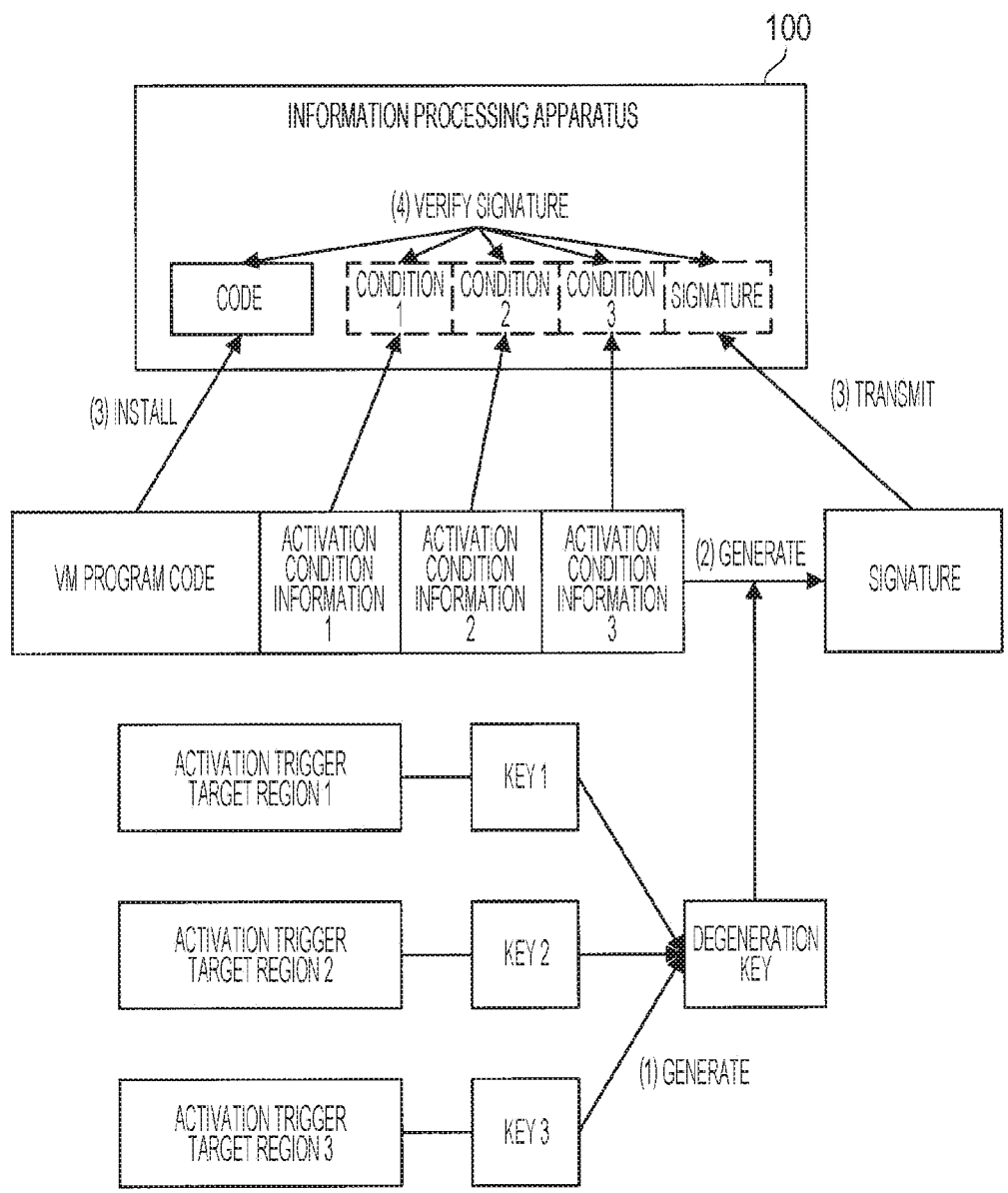
FIG. 8 is an explanatory diagram for explaining an outline of a first example of an information processing method according to a second embodiment.

FIG. 8 is an explanatory diagram for explaining an outline of a first example of the information processing method according to the second embodiment. FIG. 8 illustrates an example in which the condition information is activation condition information, as in FIG. 7A.

As illustrated in FIG. 8, in the information processing system 1000 to which the information processing method according to the second embodiment is applied, a single degeneration key is generated from a plurality of keys (keys 1 to 3 illustrated in FIG. 8) respectively corresponding to the plurality of pieces of condition information corresponding to the VM program.

Furthermore, in the information processing system 1000 to which the information processing method according to the second embodiment is applied, the first electronic signature is generated from the code of the VM program, the plurality of pieces of condition information corresponding to the VM program, and the degeneration key.

Furthermore, in the information processing apparatus 100, the condition information and the first electronic signature are associated with the VM program and are stored in the recording medium.

The information processing apparatus 100 confirms the first electronic signature associated with the VM program, for example, "when the installation of the VM is performed" or "after the installation of the VM is performed and before the VM operates". Then, the information processing apparatus 100 controls the execution of the processing regarding the VM on the basis of the confirmation result of the first electronic signature.

As can be found by comparing FIGS. 8, 7A, and 7B, the first example of the information processing method according to the second embodiment is similar to the information processing method according to the first embodiment described above, except for the method for generating the first electronic signature.

Therefore, the information processing apparatus 100 to which the information processing method according to the second embodiment is applied can improve convenience of the information processing apparatus 100 (example of device in which VM can operate), as in a case where the information processing method according to the first embodiment is applied.

Furthermore, in a case where the information processing method according to the second embodiment is applied, even when the plurality of pieces of condition information is associated with the VM program, at least one electronic signature associated with the VM program is needed.

Note that, in a case where the information processing method according to the second embodiment is applied, two or more electronic signatures including the first electronic signature generated on the basis of the degeneration key may be associated with the VM program. As an example of a case where two or more electronic signatures are associated with the VM program, "an example in which the first electronic signature based on the degeneration key generated by the plurality of keys corresponding to the activation condition information and the first electronic signature based on the degeneration key generated by the plurality of keys corresponding to the access target information are associated with the VM program" is exemplified.

Therefore, in a case where the information processing method according to the second embodiment is applied, "the increase in the number of electronic signatures associated with the VM program when the plurality of pieces of condition information is associated with the VM program" is prevented.

Furthermore, the first example of the information processing method according to the second embodiment is particularly effective when the first electronic signature is a common key type signature (MAC).

(B) Second Example of Information Processing Method According to Second Embodiment In a case where the plurality of pieces of condition information is associated with the VM program, a degeneration electronic signature (new electronic signature) is generated from a plurality first electronic signatures respectively corresponding to the plurality of pieces of condition information. The degeneration electronic signature may be generated by an arbitrary external device of the information processing apparatus 100 such as a server (not illustrated).

The degeneration electronic signature is generated, for example, by sequentially encrypting an original value of a random number or the like by using the plurality of first electronic signatures respectively corresponding to the plurality of pieces of condition information. Furthermore, the degeneration electronic signature may be generated, for example, by generating a MAC for data in which the plurality of first electronic signatures respectively corresponding to the plurality of pieces of condition information is arranged in order. The MAC corresponds to the degeneration electronic signature. Note that it goes without saying that the method for generating the degeneration electronic signature is not limited to the example described above.

The information processing apparatus 100 confirms the degeneration electronic signature, instead of the first electronic signature in a case where the information processing method according to the first embodiment is used. Then, the information processing apparatus 100 controls the execution of the processing regarding the VM on the basis of the confirmation result of the degeneration electronic signature.

As an example, the information processing apparatus 100 generates the electronic signature for verification, for example, for each piece of the condition information. Furthermore, the information processing apparatus 100 generates a degeneration electronic signature for verification from the electronic signature for verification generated for each piece of the condition information. Then, the information processing apparatus 100 confirms validity of the degeneration electronic signature by comparing the generated degeneration electronic signature for verification and the degeneration electronic signature.

Note that the processing regarding the confirmation of the degeneration electronic signature is not limited to the example described above, and the information processing apparatus 100 may confirm the degeneration electronic signature by arbitrary processing that can verify the electronic signature.

Figure 9:
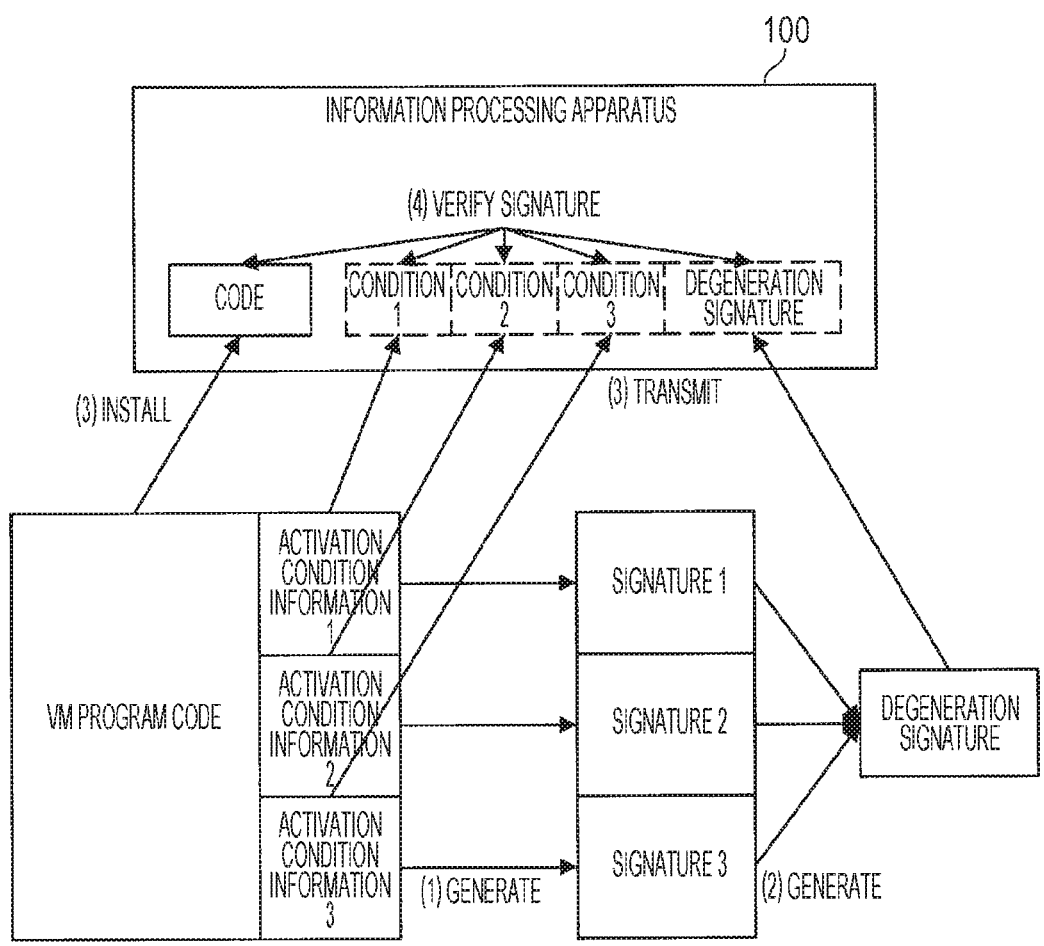
FIG. 9 is an explanatory diagram for explaining an outline of a second example of the information processing method according to the second embodiment.

FIG. 9 is an explanatory diagram for explaining an outline of a second example of the information processing method according to the second embodiment. FIG. 9 illustrates an example in which the condition information is activation condition information, as in FIG. 7A. Furthermore, in FIG. 9, the degeneration electronic signature is referred to as "a degeneration signature".

As illustrated in FIG. 9, in the information processing system 1000 to which the information processing method according to the second embodiment is applied, the plurality of first electronic signatures (signatures 1 to 3 illustrated in FIG. 9) respectively corresponding to the plurality of pieces of condition information corresponding to the VM program is generated. Furthermore, in the information processing system 1000 to which the information processing method according to the second embodiment is applied, the degeneration electronic signature is generated from the plurality of first electronic signatures.

Furthermore, in the information processing apparatus 100, the condition information and the degeneration electronic signature are associated with the VM program and are stored in the recording medium.

The information processing apparatus 100 confirms the degeneration electronic signature associated with the VM program, for example, "when the installation of the VM is performed" or "after the installation of the VM is performed and before the VM operates". Then, the information processing apparatus 100 controls the execution of the processing regarding the VM on the basis of the confirmation result of the degeneration electronic signature.

As can be seen by comparing FIGS. 9, 7A, and 7B, the second example of the information processing method according to the second embodiment is similar to the information processing method according to the first embodiment described above except that the first electronic signature is the degeneration electronic signature.

Therefore, the information processing apparatus 100 to which the information processing method according to the second embodiment is applied can improve convenience of the information processing apparatus 100 (example of device in which VM can operate), as in a case where the information processing method according to the first embodiment is applied.

Furthermore, in a case where the information processing method according to the second embodiment is applied, even when the plurality of pieces of condition information is associated with the VM program, at least one electronic signature associated with the VM program is needed.

Note that, in a case where the information processing method according to the second embodiment is applied, two or more degeneration electronic signatures may be associated with the VM program. As an example of a case where the two or more degeneration electronic signatures are associated with the VM program, "an example in which a degeneration electronic signature generated from the plurality of electronic signatures corresponding to the activation condition information and a degeneration electronic signature generated from the plurality of electronic signatures corresponding to the access target information are associated with the VM program" is exemplified.

Therefore, in a case where the information processing method according to the second embodiment is applied, "the increase in the number of electronic signatures associated with the VM program when the plurality of pieces of condition information is associated with the VM program" is prevented.

Furthermore, the second example of the information processing method according to the second embodiment is particularly effective when the degeneration electronic signature is a common key type signature (MAC).

[2-3] Information Processing Method According to Third Embodiment

By applying the information processing method according to the first embodiment or the information processing method according to the second embodiment, it is possible to improve the convenience of the information processing apparatus 100 (example of device in which VM can operate).

Here, in a case where the information processing method according to the first embodiment or the information processing method according to the second embodiment is applied, for example, it is not possible to cope with "a use case where, after a VM program is associated with an electronic signature in the information processing apparatus 100, a provider of the VM program or the like desires to limit an operation of a VM".

Therefore, in an information processing system 1000 to which an information processing method according to a third embodiment is applied, an information processing apparatus 100 further has a function for controlling execution of processing regarding the VM on the basis of control information used to control the execution of the processing regarding the VM.

As the control information according to the present embodiment, for example, a table (or database) in which information used to specify the VM program and information indicating limitation content are recorded in association with each other" is exemplified. Note that the control information according to the present embodiment is not limited to the table (or database) described above and may be data in an arbitrary format, for example, data for each VM program or the like. The control information may be generated by an arbitrary external device of the information processing apparatus 100 such as a server (not illustrated).

As the information used to specify the VM program, for example, arbitrary data from which the VM program can be identified, such as an ID of the VM program, a hash value that is at least a part of a program code, a MAC, or the like is exemplified.

As the information indicating the limitation content, for example, arbitrary data that defines the limitation content of the operation of the VM, such as data indicating that installation of the VM is prohibited, data indicating that the execution of the VM program is prohibited, or the like is exemplified.

The information processing apparatus 100 determines "whether or not a target VM program is a VM program set in the control information", for example, on the basis of the information used to specify the VM program included in the control information. The information processing apparatus 100 determines "whether or not the target VM program is the VM program set in the control information", for example, at the time of the installation of the VM or at the time of the execution of the VM program. Note that the information processing apparatus 100 may assume that all the VM programs stored in a recording medium are the VM programs and may determine that "whether or not the target VM program is the VM program set in the control information" at an arbitrary timing.

Then, the information processing apparatus 100 controls the execution of the processing regarding the VM according to the determination result based on the control information.

As an example, the information processing apparatus 100 does not execute the prohibited processing if the execution of the VM program and the installation of the VM program are prohibited at the time of the installation of the VM or at the time of the execution of the VM program. As another example, in a case where the installation of the VM program is prohibited after the VM has been installed, the information processing apparatus 100 uninstalls the VM program or prohibits the execution of the VM program.

Note that the processing of the information processing apparatus 100 according to the third embodiment is not limited to the example described above.

For example, in a case where the information processing method according to the third embodiment is applied, the electronic signature may be given to the control information. Hereinafter, there is a case where an electronic signature given to a single piece of control information is referred to as "a second electronic signature".

The second electronic signature may be generated by an arbitrary external device of the information processing apparatus 100 such as a server (not illustrated). Furthermore, in the information processing apparatus 100, the control information and the second electronic signature are associated with each other by arbitrary association method and are stored in the recording medium.

In a case where the second electronic signature is associated with the control information, the information processing apparatus 100 controls the execution of the processing regarding the VM based on the control information on the basis of the confirmation result of the second electronic signature.

For example, in a case where validity of the second electronic signature has been confirmed, the information processing apparatus 100 can control the execution of the processing regarding the VM based on the control information. Furthermore, in a case where the validity of the second electronic signature has not been confirmed, the information processing apparatus 100 does not control the execution of the processing regarding the VM based on the control information.

The information processing apparatus 100 confirms the second electronic signature, for example, by using a key associated with a region indicated by "the condition information associated with the VM program to be controlled by the control information".

For example, in a case where a signature is made by using at least one or more keys from among the keys associated with the region indicated by "the condition information associated with the VM program to be controlled by the control information", the information processing apparatus 100 determines that the second electronic signature is a correct signature. Furthermore, for example, in a case where a signature is made by using all the keys associated with the region indicated by "the condition information associated with the VM program to be controlled by the control information", the information processing apparatus 100 may determine that the second electronic signature is a correct signature.

The information processing apparatus 100 to which the information processing method according to the third embodiment is applied controls the execution of the processing regarding the VM based on the control information as described above. Therefore, the information processing apparatus 100 to which the information processing method according to the third embodiment is applied can cope with "the use case where the provider of the VM program or the like desire to limit the operation of the VM after the VM program and the electronic signature are associated with each other in the information processing apparatus 100".

Therefore, the information processing apparatus 100 to which the information processing method according to the third embodiment is applied can improve the convenience of the information processing apparatus 100 (example of device in which VM can operate) than a case where the information processing method according to the first embodiment or the information processing method according to the second embodiment is applied.

[2-4] Information Processing Method According to Fourth Embodiment

By applying at least one of the information processing method according to the first embodiment to the information processing method according to the third embodiment, it is possible to improve the convenience of the information processing apparatus 100 (example of device in which VM can operate).

Here, in the information processing apparatus 100, "a case where a region indicated by condition information (that is region associated with key used to generate valid electronic signature) is deleted after the signed VM program is installed" is assumed. In a case where the above case occurs, the VM program executed by the information processing apparatus 100 waits for an activation condition that is never satisfied or tries to access a region that does not exist.

Therefore, in an information processing system 1000 to which an information processing method according to a fourth embodiment is applied, the information processing apparatus 100 performs one of the following in a case where condition information indicating a region to be deleted exists when a region of a recording medium is deleted.

Do not delete the region to be deleted.

Execute predetermined processing on a VM program associated with the condition information indicating the region to be deleted.

As the predetermined processing according to the fourth embodiment, for example, "processing for uninstalling the VM program associated with the condition information indicating the region to be deleted" and "processing for invalidating the VM program associated with the condition information indicating the region to be deleted" are exemplified. As the processing for invalidating the VM program, one or both of processing for making the VM program invalid and processing for invalidating the condition indicated by the condition information associated with the VM program are exemplified.

In the information processing apparatus 100 to which the information processing method according to the fourth embodiment is applied, as described above, in a case where the condition information indicating the region to be deleted exists when the region of the recording medium is deleted, the region to be deleted is not deleted or the predetermined processing is executed on the VM program. Therefore, the information processing apparatus 100 to which the information processing method according to the fourth embodiment is applied prevents that "the VM program waits for the activation condition that is never satisfied or the VM program tries to access the region that does not exist".

Therefore, the information processing apparatus 100 to which the information processing method according to the fourth embodiment is applied can improve convenience of the information processing apparatus 100 (example of device in which VM can operate).

[2-5] Information Processing Method According to Fifth Embodiment

[2-5-1] Outline of Information Processing System 1000 to which Information Processing Method According to Fifth Embodiment is Applied Some devices compatible with the NFC such as IC cards have the feature that atomicity of the result of a single time of command execution is ensured. As an example in which the atomicity is ensured, "an example in which, in a case where writing to regions A to C is instructed in a parameter of a single time of a command, even if the command is interrupted, a result is obtained such that all the writing to the regions A to C is performed or all the writing to the regions A to C is not performed" is exemplified.

Therefore, in an information processing system 1000 to which the information processing method according to the fifth embodiment is applied, an information processing apparatus 100 that can operate a VM ensures the atomicity as in the example described above. As an example, in the information processing system 1000 to which the information processing method according to the fifth embodiment is applied, "to obtain one of the results such that all the writing including the writing by the command and the writing by the VM program succeeds or fails in the information processing apparatus 100" is realized.

Figure 10:
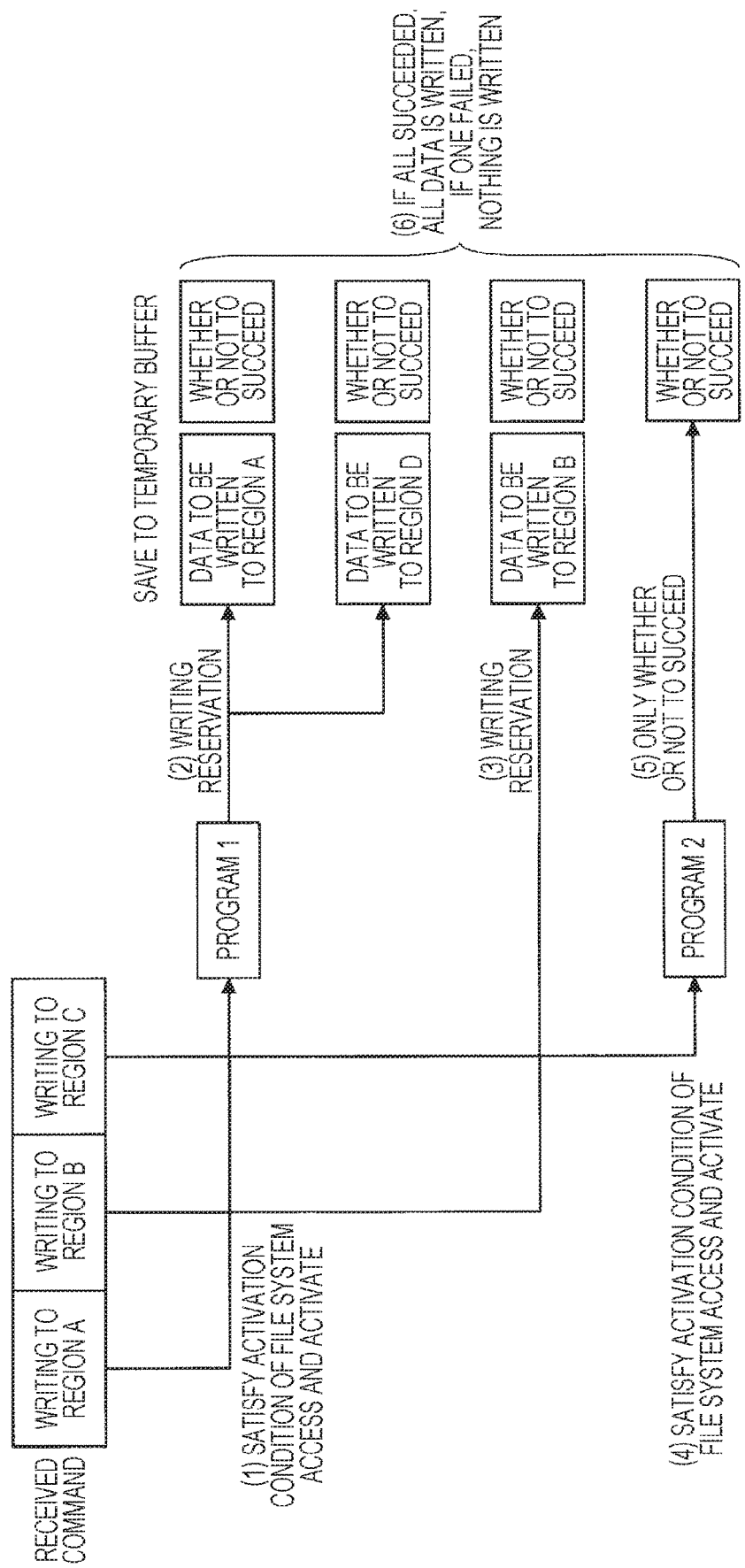
FIG. 10 is an explanatory diagram for explaining an outline of an information processing method according to a fifth embodiment.

FIG. 10 is an explanatory diagram for explaining an outline of the information processing method according to the fifth embodiment. FIG. 10 illustrates an example of processing by the information processing apparatus 100 that has received the command instructing the writing to the regions A to C in the parameter.

For example, when an access to a file system is made by the received command and the VM program is activated by satisfying an activation condition, the information processing apparatus 100 does not immediately perform writing to the file system by the VM program and the writing to the file system by the command, and whether or not each processing is succeeded and the written date are held in a temporary buffer. For example, in a case where the hardware configuration illustrated in FIG. 3 is included, a recording medium, for example, the RAM 168, the nonvolatile memory 170, or the like serves as the temporary buffer.

After completing the processing on the basis of each parameter included in the command, in a case where all the processing results indicates that the processing has been succeeded, the information processing apparatus 100 reflects all the data held in the temporary buffer to the file system. Furthermore, after completing the processing on the basis of each parameter included in the command, in a case where at least one processing result indicates that the processing has failed, the information processing apparatus 100 does not reflect all the data held in the temporary buffer to the file system.

For example, by executing the processing illustrated in FIG. 10, "to obtain one of the results such that all the writing including the writing by the command and the writing by the VM program succeeds or fails" is realized. Therefore, the atomicity of the information processing apparatus 100 is ensured.

Therefore, the information processing apparatus 100 to which the information processing method according to the fifth embodiment is applied can improve convenience of the information processing apparatus 100 (example of device in which VM can operate).

[2-5-2] Processing According to Information Processing Method by Information Processing Apparatus 100 According to Fifth Embodiment Next, an example of processing according to the information processing method by the information processing apparatus 100 according to the fifth embodiment will be described.

The information processing apparatus 100 has a function for operating a VM, for example, similarly to the information processing apparatuses 100 according to the first embodiment to the fourth embodiment described above.

Note that the information processing apparatus 100 according to the fifth embodiment may or does not have to control an operation of the VM according to the confirmation result of the electronic signature as performed by the information processing apparatuses 100 according to the first embodiment to the fourth embodiment. That is, the control of the operation of the VM according to the confirmation result of the electronic signature is not essential for ensuring the atomicity described above. Therefore, it is sufficient that at least the condition information be associated with the virtual machine program that operates the VM according to the fifth embodiment.

Furthermore, the information processing apparatus 100 has a function for processing a command acquired from an external device including a function for writing data on the basis of a writing command. Hereinafter, the processing for ensuring the atomicity described above will be described using a case where the information processing apparatus 100 processes the writing command as an example.

In a case where the writing command is acquired, the information processing apparatus 100 operates the VM in a case where a region indicated by a parameter of the writing command is a region indicated by condition information.

Furthermore, in a case where the writing command is acquired, the information processing apparatus 100 determines whether or not that all the data writing performed on the basis of the writing command can be normally performed. For example, as described with reference to FIG. 10, the information processing apparatus 100 does not immediately perform the writing to the file system and holds whether or not all the data writing is succeeded and the written data in the temporary buffer.

Then, when it is determined that all the data writing can be normally performed, the information processing apparatus 100 writes data on the basis of the writing command. For example, as described with reference to FIG. 10, after completing the processing on the basis of each parameter included in the command, in a case where all the processing results indicates that the processing has been succeeded, the information processing apparatus 100 reflects all the data held in the temporary buffer to the file system.

Furthermore, when it is not determined that all the data writing can be normally performed, the information processing apparatus 100 does not write data on the basis of the writing command. For example, as described with reference to FIG. 10, after completing the processing on the basis of each parameter included in the command, in a case where the result of at least one processing indicates a failure, the information processing apparatus 100 does not reflect all the data held in the temporary buffer to the file system.

For example, as described above, the information processing apparatus 100 determines whether or not all the data writing performed on the basis of the writing command can be normally performed and selectively writes the data on the basis of the writing command according to the determination result. Therefore, the information processing apparatus 100 ensures the atomicity.

Here, in a case where the VM is operated on the basis of the writing command, the data writing based on the writing command includes data writing performed by the VM program.

[2-6] Information Processing Method According to Other Embodiment

Processing according to an information processing method according to the present embodiment is not limited to the processing according to the information processing method according to the first embodiment to the processing according to the information processing method according to the fifth embodiment.

For example, the processing according to the information processing method according to the present embodiment may be processing implemented by combining two or more of the processing according to the information processing method according to the first embodiment to the processing according to the information processing method according to the fifth embodiment.

[3] Example of Effects Obtained by Using Information Processing Method According to Present Embodiment By using the information processing method according to the present embodiment, for example, the following effects (a) to (d) are obtained. Note that it goes without saying that the effects obtained by using the information processing method according to the present embodiment are not limited to the examples below.

(a) Cooperation with OS and Implementation of VM Program by Advanced Application Programming Interface (API)

A VM program according to the present embodiment can provide an advanced API that has a function for customizing a function of an OS such as the Felica (registered trademark) OS.

For example, by providing the API in cooperation with the OS in the VM program, the VM program can be operated in cooperation with movement of the OS. As an example, by making a writing operation of the OS cooperate with a writing operation by the VM program, atomicity of the writing operation can be ensured as indicated in the information processing method according to the fifth embodiment. Furthermore, by ensuring the atomicity of the writing operation, it is possible to cope with a case where power is stopped before the writing is completed (in a case where power is cut off).

A basic part of an application can be implemented as a code (native code) that natively operates in a processor that operates at high speed, and the function for customizing the function of the OS can be implemented by the VM program. With such an implementation, for example, even in a case where a low-speed program that operates in the VM is included, an application that operates at high speed can be realized. Furthermore, with such an implementation, the function can be compactly realized, and an advanced function can be realized in a limited memory resource. In a case where the information processing apparatus 100 is an IC card, it is particularly useful that the advanced function can be realized in the limited memory resource.

(b) Activation Conditions of VM Program

Since the VM program is activated according to the condition information, the VM program can be executed at a predetermined timing without specifying the timing from outside of the information processing apparatus 100. Therefore, since the VM program is executed without depending on the external device such as the reader/writer 200, the function of the information processing apparatus 100 can be expanded by the VM program, for example, without changing the external device existing in the market. Furthermore, since the VM program is executed without depending on the external device such as the reader/writer 200, for example, the external device does not need to be aware of the existence of the VM program.

By using any one of processing according to the information processing method according to the first embodiment to the information processing method according to the fourth embodiment, the execution of the processing regarding the VM is controlled on the basis of the confirmation result of the electronic signature. Here, in the information processing apparatus 100, for example, the electronic signature is checked and saved at the time of download, it is not necessary to confirm the electronic signature at the time of execution, and the program can be executed at high speed.

(c) Pre-Setting of Access Target

For example, by downloading the information regarding resource access authority (for example, condition information and electronic signature) as metadata of the VM program, it is not necessary to perform mutual authentication at the time of execution of the VM program, and the VM program can access the resource of the OS. Here, execution authority is signed for each required access authority and is set for the information processing apparatus 100. Furthermore, in the information processing apparatus 100, for example, the electronic signature is checked and saved at the time of download, it is not necessary to confirm the electronic signature at the time of execution, and the program can be executed at high speed.

It is possible to add limitation to an access target for each condition.

(d) Addition of Functions in Market

The download of the VM program may be implemented as a command that can be issued in the market, and the functions of the information processing apparatus 100 can be added in the market.

The unnecessary VM program may be deleted in the market by the command that can be issued in the market.

By making it possible to download the VM program in a free space without requiring a dedicated region for the VM program, the information processing apparatus 100 can effectively use the memory.

Without deleting an existing application, the operation for adding the function can be realized by the VM program. With this operation, for example, an existing data structure can be taken over, and additional movement by the VM program can be realized.

After the applications are downloaded by (b) and (c) above, the function can be added to the information processing apparatus 100 without changing the external device such as a reader/writer in the market. As an example, the function can be added by the information processing apparatus 100 side without changing a sequence applied to the information processing apparatus 100.

[4] Use Cases to which Information Processing Method According to Present Embodiment is Applied Next, use cases to which the information processing method according to the present embodiment described above is applied will be described. Note that it goes without saying that the use case to which the information processing method according to the present embodiment is not limited to the example below.

[4-1] First Example of Use Case: Coupon Provision by VM

As a first example of the use case, a use case in which a coupon is provided by the VM will be described.

FIGS. 11A and 11B are explanatory diagrams for explaining the first example of the use case to which the information processing method according to the present embodiment is applied. FIG. 11A illustrates a state of a recording medium included in the information processing apparatus 100 before the VM program is installed. Furthermore, FIG. 11B illustrates a state of a recording medium included in the information processing apparatus 100 after the VM program has been installed.

A signature of the activation condition information (example of condition information) is created, for example, by a person (for example, electronic money business operator) who has an authority of a parent area of a region (block) that is a condition for activating the VM program. Furthermore, a signature of the access target information (example of condition information) is created, for example, by a person (for example, electronic money business operator) who has an authority of a parent area of a region (block) where a coupon accessed by the VM program is saved.

The VM program, the activation condition information and the signature, and the access target information and the signature may be integrated into a single package with a signature. Here, the package with the signature according to the present embodiment is to be encrypted and signed. Since the package with the signature is concealed and signed, the package can be safely downloaded in the market.

The activation condition information and the signature and the access target information and the signature correspond to the metadata of the VM program.

For example, in a case where the packaged VM program is downloaded to the information processing apparatus 100, the information processing apparatus 100 verifies the signature and confirms that the signature is not falsified. By confirming the signature at the time of download, for example, it is not necessary to save the signature in the information processing apparatus 100. Even in a case where a capacity of a nonvolatile memory included in the information processing apparatus 100 is small, it is possible to safely execute the VM program.

Note that, the information processing apparatus 100 may confirm the signature, for example, at the time of activating the information processing apparatus 100 or at the time of executing the program. Furthermore, by saving the electronic signature in the information processing apparatus 100 and checking the saved signature by the information processing apparatus 100, for example, each time when the program is executed, it is possible to further enhance the security.

For example, by downloading the packaged VM program to the information processing apparatus 100, the state of the recording medium included in the information processing apparatus 100 is changed, for example, from the state illustrated in FIG. 11A to the state illustrated in FIG. 11B.

Figure 12:
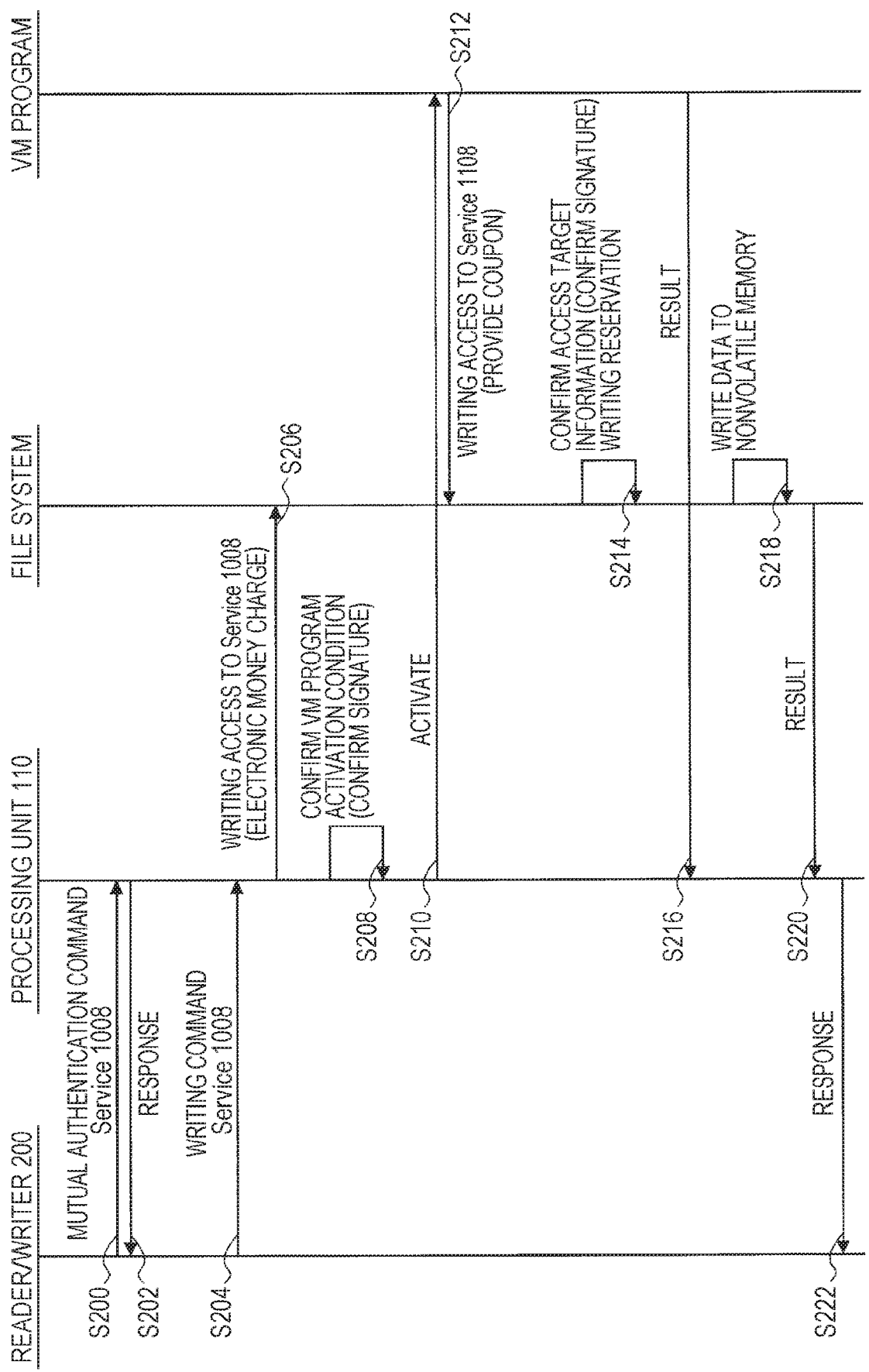
FIG. 12 is an explanatory diagram for explaining the first example of the use case to which the information processing method according to the present embodiment is applied.

FIG. 12 is an explanatory diagram for explaining the first example of the use case to which the information processing method according to the present embodiment is applied. FIG. 12 illustrates an example of processing by the information processing system 1000 illustrated in FIG. 1.

The reader/writer 200 transmits a mutual authentication command regarding Service 1008 illustrated in FIGS. 11A and 11B (S200), and the processing unit 110 returns a response after executing processing according to the mutual authentication command (S202). The processing in steps S200 and S202 corresponds to mutual authentication regarding Service 1008. In the following, a case where the mutual authentication is normally completed will be described as an example.

The reader/writer 200 transmits a writing command used to write Service 1008 (S204).

The processing unit 110 that has acquired the writing command transmitted from the reader/writer 200 in step S204 makes a writing access to Service 1008 with respect to the file system on the basis of the writing command (S206). FIG. 12 illustrates electronic money charging (processing for adding value of electronic value) as the processing indicated in step S206.

Furthermore, the processing unit 110 confirms an activation condition of the VM program after confirming the signature (S208), and the processing unit 110 activates the VM program in a case where the signature is confirmed and the activation condition is satisfied (S210).

In a case where the VM program is executed and the writing access to Service 1108 is made, the VM program confirms, for example, that the access target information includes update information of a Service 1108 block. At this time, the VM program may confirm the signature 2 illustrated in FIGS. 11A and 11B.

The VM program makes the write access to Service 1108 illustrated in FIGS. 11A and 11B (S212). In FIG. 12, as the processing indicated in step S212, the processing regarding the coupon provision is illustrated.

The VM program confirms a condition of the access target information after confirming the signature, and reserves writing to Service 1108 in a case where the signature is confirmed and the condition is satisfied (S214). For example, the VM program reserves, for example, to write a coupon corresponding to the writing to Service 1008 (for example, coupon corresponding to additional value (so-called charge amount) of value of electronic value). Furthermore, the VM program transmits the processing result in step S214 to the processing unit 110 (S216). Here, in the access target information, for example, information indicating that Service 1108 is accessed and an authority to write to Service 1108 are defined.

In a case where the result indicating that the writing reservation is normally made in step S216 is transmitted to the processing unit 110, the file system writes data to the nonvolatile memory (S218), and the result of writing is transmitted to the processing unit 110 (S220). For example, writing to Service 1008 is performed by the processing unit 110, and writing to Service 1108 is performed by the VM program. After writing to Service 1108 is performed, the VM program is normally terminated.

The processing unit 110 returns a response which has been normally processed as a response to the writing command transmitted from the reader/writer 200 in step S204 (S222).

For example, by executing the processing illustrated in FIG. 12, the VM provides a coupon. Note that it goes without saying that the processing for realizing the coupon provision by the VM is not limited to the example illustrated in FIG. 12.

[4-2] Second Example of Use Case: Electronic Money Using Limit Amount Setting by VM As a second example of the use case, a use case in which an electronic money using limit amount is set by the VM will be described.

Figure 13B:
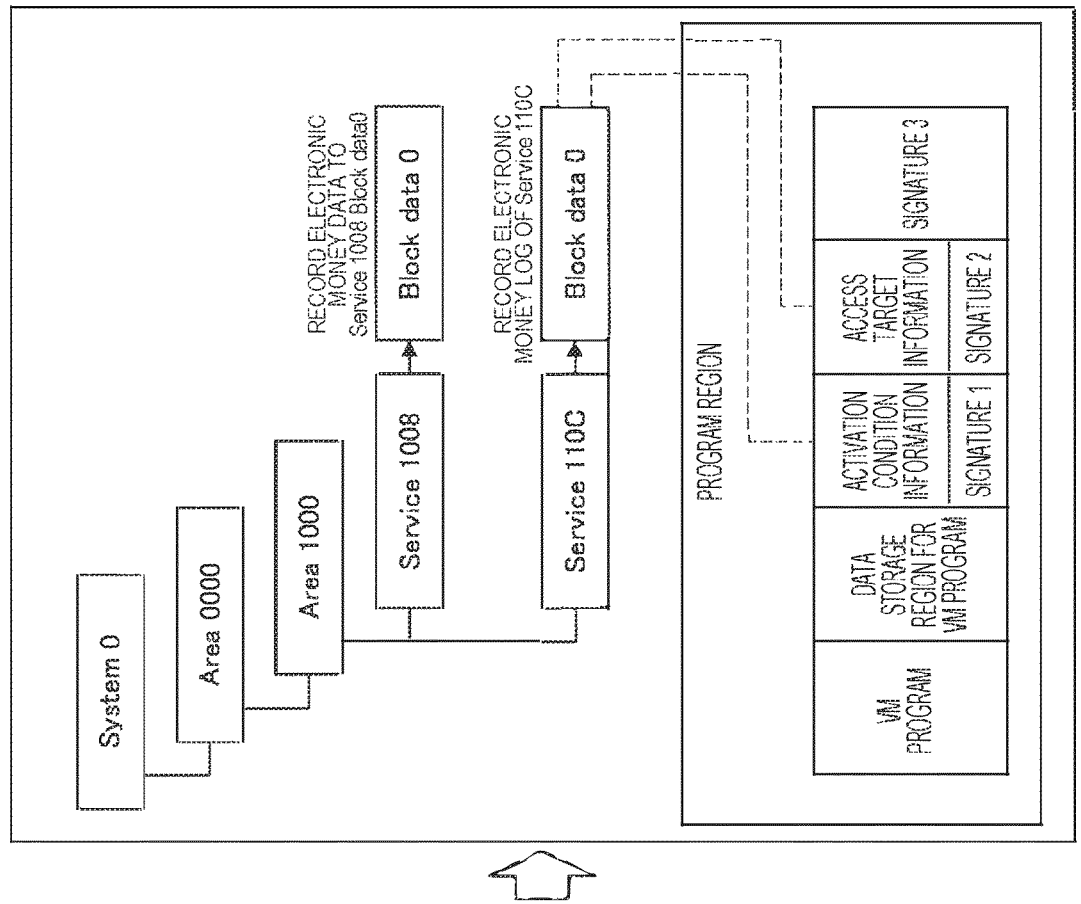
FIGS. 13A and 13B are explanatory diagrams for explaining a second example of the use case to which the information processing method according to the present embodiment is applied.
Figure 13A:
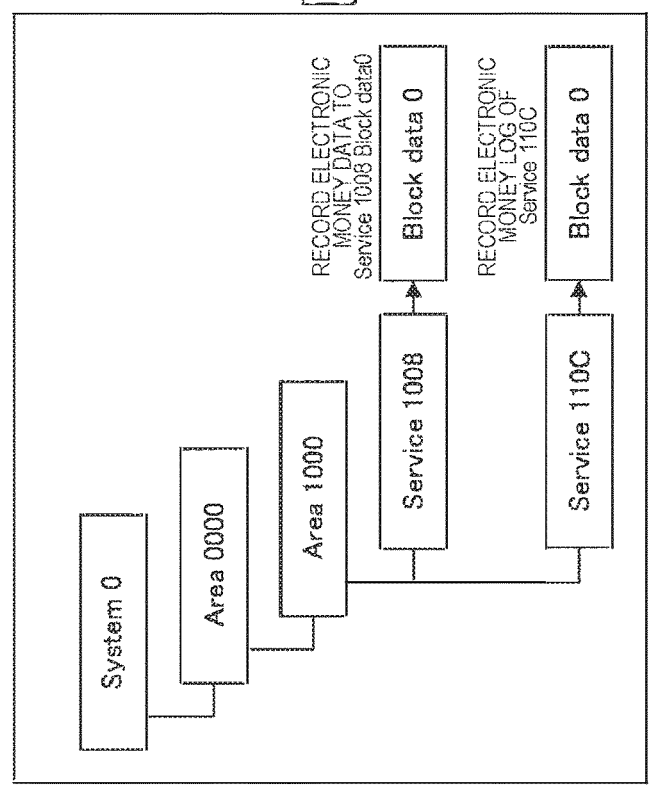

FIGS. 13A and 13B are explanatory diagrams for explaining the second example of the use case to which the information processing method according to the present embodiment is applied. FIG. 13A illustrates a state of a recording medium included in the information processing apparatus 100 before the VM program is installed. Furthermore, FIG. 13B illustrates a state of a recording medium included in the information processing apparatus 100 after the VM program has been installed.

A signature of the activation condition information (example of condition information) is created, for example, by a person (for example, electronic money business operator) who has an authority of a parent area that is a condition for activating the VM program.

The VM program and the activation condition information and the signature may be integrated into a single package with a signature. Since the package with the signature is concealed and signed, the package can be safely downloaded in the market.

For example, in a case where the packaged VM program is downloaded to the information processing apparatus 100, the information processing apparatus 100 verifies the signature and confirms that the signature is not falsified. By confirming the signature at the time of download, for example, it is not necessary to save the signature in the information processing apparatus 100. Even in a case where a capacity of a nonvolatile memory included in the information processing apparatus 100 is small, it is possible to safely execute the VM program.

Note that, the information processing apparatus 100 may confirm the signature, for example, at the time of activating the information processing apparatus 100 or at the time of executing the program. Furthermore, by saving the electronic signature in the information processing apparatus 100 and checking the saved signature by the information processing apparatus 100, for example, each time when the program is executed, it is possible to further enhance the security.

For example, by downloading the packaged VM program to the information processing apparatus 100, the state of the recording medium included in the information processing apparatus 100 is changed, for example, from the state illustrated in FIG. 13A to the state illustrated in FIG. 13B. For example, as illustrated in FIG. 13B, the VM program may be a program for saving data in a dedicated region of the VM program.

Figure 14:
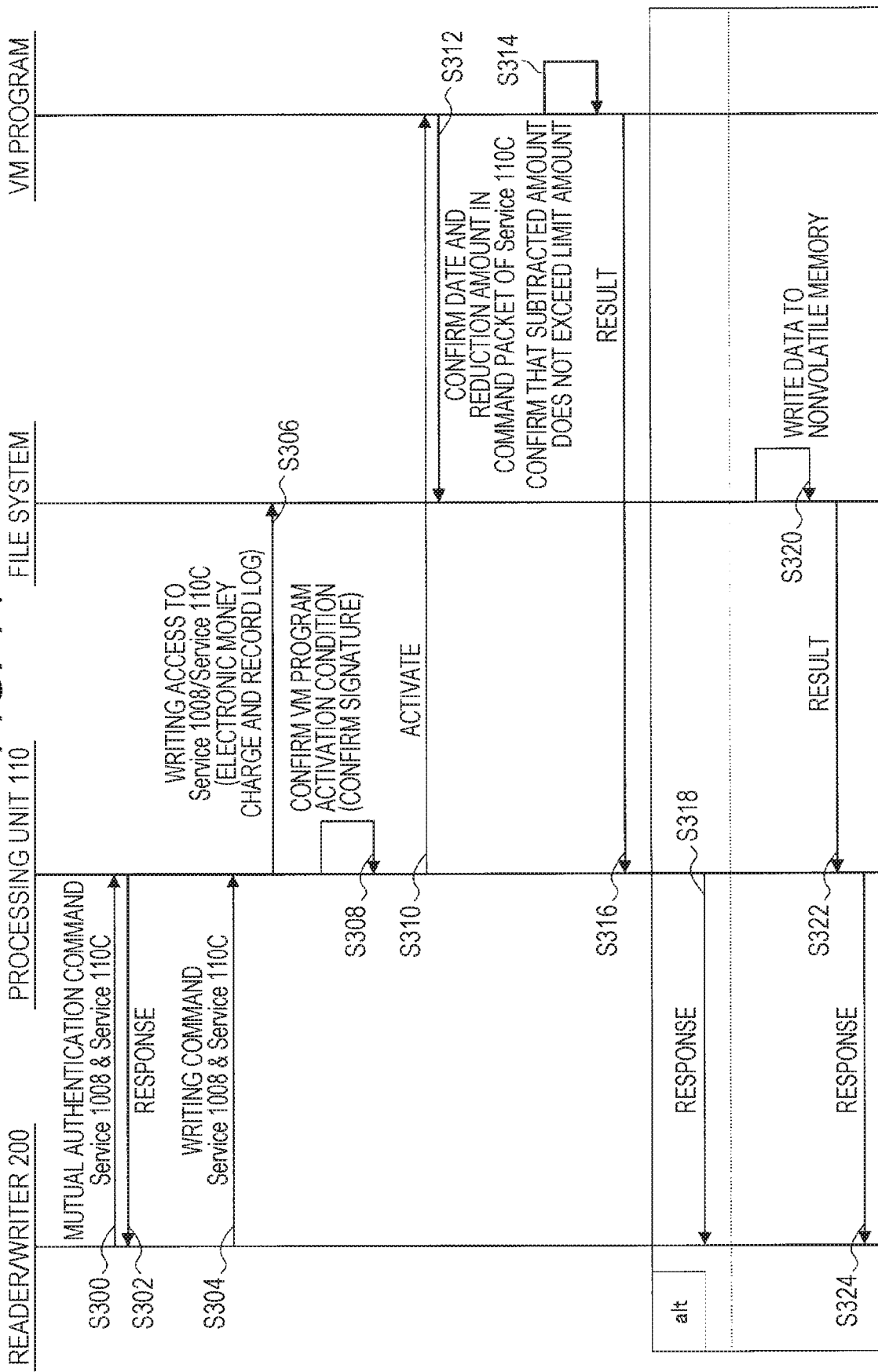
FIG. 14 is an explanatory diagram for explaining the second example of the use case to which the information processing method according to the present embodiment is applied.

FIG. 14 is an explanatory diagram for explaining the second example of the use case to which the information processing method according to the present embodiment is applied. FIG. 14 illustrates an example of processing by the information processing system 1000 illustrated in FIG. 1.

The reader/writer 200 transmits a mutual authentication command regarding Service 1008 and Service 110C illustrated in FIGS. 13A and 13B (S300), and the processing unit 110 returns a response after executing processing according to the mutual authentication command (S302). The processing in steps S300 and S302 corresponds to the mutual authentication regarding Service 1008 and Service 110C, similarly to the processing in steps S200 and S202 illustrated in FIG. 12. In the following, a case where the mutual authentication is normally completed will be described as an example.

The reader/writer 200 transmits a writing command used to write Service 1008 (S304).

The processing unit 110 that has acquired the writing command transmitted from the reader/writer 200 in step S304 makes a writing access to Service 1008 and Service 110C with respect to the file system on the basis of the writing command (S306). In FIG. 14, as the processing indicated in step S306, electronic money charging (processing for adding value of electronic value) and processing for recording logs are illustrated.

Furthermore, the processing unit 110 confirms the activation condition of the VM program after confirming the signature (S308) and activates the VM program in a case where the signature is confirmed and the activation condition is satisfied (S310).

In a case where a data reference access is made by a command packet, the VM program confirms whether or not the access target information includes data reference information in the command packet of Service 110C. At this time, the VM program may confirm the signature 2 illustrated in FIGS. 13A and 13B.

The VM program writes a reduced amount and a date of Service 110C into a data storage region for the VM program illustrated in FIGS. 13A and 13B. At this time, for example, in a case where a limit amount per day is set, the VM program confirms the date and the reduced amount in the command packet of Service 110C (S312). Then, the VM program confirms whether or not the subtracted amount exceeds the limit amount (S314) and transmits the result to the processing unit 110 (S316). The limit amount is, for example, embedded in the VM program or is recorded in the data storage region for the VM program.

In a case where it is confirmed in step S314 that the reduction amount exceeds the limit amount, the processing unit 110 returns an error as a response to the writing command transmitted from the reader/writer 200 in step S304 (S318).

Furthermore, in a case where it is confirmed in step S314 that the reduction amount does not exceed the limit amount, the file system writes data to the nonvolatile memory (S320), and the writing result is transmitted to the processing unit 110 (S322). For example, writing to Service 1008 is performed by the processing unit 110, and writing to Service 110C is performed by the VM program. After writing to Service 110C is performed, the VM program is normally terminated.

The processing unit 110 returns a response which has been normally processed as a response to the writing command transmitted from the reader/writer 200 in step S304 (S324).

For example, by executing the processing illustrated in FIG. 14, the electronic money use limit amount is set by the VM. Note that it goes without saying that the processing for realizing the electronic money use limit amount setting by the VM is not limited to the example illustrated in FIG. 14.

Program According to Present Embodiment

A program that causes a computer system to function as an information processing apparatus according to the present embodiment (for example, program that can realize a part of or all of function of processing unit 110 that executes processing according to information processing method according to first embodiment to function of processing unit 110 that executes processing according to information processing method according to fifth embodiment) is executed by a processor or the like in the computer system so that convenience of a device in which a virtual machine can operate can be improved. Here, as the computer system according to the present embodiment, a single computer system or a plurality of computers is exemplified. The computer system according to the present embodiment executes a series of processing.

Furthermore, by executing the program that functions the computer system as the information processing apparatus according to the present embodiment by the processor or the like in the computer system, the effects obtained by the processing according to the information processing method according to each embodiment can be obtained.

The preferred embodiments of the present disclosure have been described in detail above with reference to the drawings. However, the technical scope of the present disclosure is not limited to the examples. It is obvious that a person who has normal knowledge in the technical field of the present disclosure can arrive at various variations and modifications in the scope of the technical ideas described in claims. It is understood that the variations and modifications naturally belong to the technical scope of the present disclosure.

For example, in the above, it is described that the program (computer program) that causes the computer system to function as the information processing apparatus according to the present embodiment is provided. However, the present embodiment can also provide a recording medium that stores the program.

The configuration described above is an example of the present embodiment and naturally belongs to the technical scope of the present disclosure.

Furthermore, the effects described in the present specification are merely illustrative and exemplary and not limited. That is, the technology according to the present disclosure may exhibit other effects obvious to those skilled in the art from the description in the present specification together with or instead of the above described effects.

Note that the following configuration belongs to the technical scope of the present disclosure.

(1)

An information processing apparatus including:

a processing unit having a function for controlling execution of processing regarding a virtual machine, in which a virtual machine program that operates the virtual machine is associated with condition information that includes information indicating a region of a recording medium and indicates a condition under which the virtual machine is operated, a code of the virtual machine program, and a first electronic signature generated on the basis of the condition information, and the processing unit controls the execution of the processing regarding the virtual machine on the basis of a confirmation result of the first electronic signature associated with the virtual machine program.

(2)

The information processing apparatus according to (1), in which the processing unit can execute the processing regarding the virtual machine in a case where validity of the first electronic signature is confirmed, and executes predetermined error processing in a case where the validity of the first electronic signature is not confirmed.

(3) The information processing apparatus according to (1) or (2), in which the processing regarding the virtual machine includes one or both of processing for installing the virtual machine and processing for operating the virtual machine on the basis of the condition information.

(4)

The information processing apparatus according to any one of (1) to (3), in which the first electronic signature is generated on the basis of a key corresponding to the condition information, and the processing unit confirms the first electronic signature by using a key associated with the region indicated by the condition information.

(5)

The information processing apparatus according to any one of (1) to (4), in which the processing unit confirms the first electronic signature when the virtual machine is installed or after the virtual machine has been installed and before the virtual machine is operated.

(6)

The information processing apparatus according to any one of (1) to (5), in which in a case where a plurality of pieces of the condition information is associated with the virtual machine program, the first electronic signature is generated on the basis of the code of the virtual machine program, the plurality of pieces of condition information, and a degeneration key generated on the basis of a plurality of keys respectively corresponding to the plurality of pieces of condition information.

(7)

The information processing apparatus according to any one of (1) to (5), in which in a case where a plurality of pieces of the condition information is associated with the virtual machine program, the virtual machine program that operates the virtual machine is associated with a degeneration electronic signature generated on the basis of the plurality of first electronic signatures respectively corresponding to the plurality of pieces of condition information, and the processing unit controls the execution of the processing regarding the virtual machine on the basis of a confirmation result of the degeneration electronic signature associated with the virtual machine program.

(8)

The information processing apparatus according to any one of (1) to (7), in which the processing unit further controls the execution of the processing regarding the virtual machine on the basis of control information used to control the execution of the processing regarding the virtual machine, the control information is associated with a second electronic signature, and the processing unit controls the execution of the processing regarding the virtual machine based on the control information on the basis of a confirmation result of the second electronic signature.

(9)

The information processing apparatus according to (8), in which the processing unit confirms the second electronic signature by using the key associated with the region indicated by the condition information associated with the virtual machine program to be controlled by using the control information.

(10)

The information processing apparatus according to any one of (1) to (9), in which in a case where the condition information indicating a region to be deleted exists when a region of a recording medium is deleted, the processing unit does not delete the region to be deleted or executes predetermined processing regarding the virtual machine program associated with the condition information indicating the region to be deleted.

(11)

The information processing apparatus according to any one of (1) to (10), in which the information processing apparatus includes an IC card.

(12)

An information processing apparatus including:

a processing unit having a function for operating a virtual machine and a function for writing data on the basis of a writing command acquired from an external device, in which a virtual machine program that operates the virtual machine is associated with condition information that includes information indicating a region of a recording medium and indicates a condition under which the virtual machine is operated, in a case where the writing command is acquired from an external device, the processing unit
operates the virtual machine in a case where a region indicated by a parameter of the writing command is a region indicated by the condition information,
determines whether or not all data writing performed on the basis of the writing command can be normally performed,
writes data on the basis of the writing command when it is determined that all the data writing can be normally performed, and
does not write data on the basis of the writing command when it is not determined that all the data writing can be normally performed, and
in a case where the virtual machine operates on the basis of the writing command, the data writing based on the writing command includes data writing performed by the virtual machine program.

(13)
An information processing method executed by an information processing apparatus, the method including:
a step for controlling execution of processing regarding a virtual machine, in which
a virtual machine program that operates the virtual machine is associated with condition information that includes information indicating a region of a recording medium and indicates a condition under which the virtual machine is operated, a code of the virtual machine program, and a first electronic signature generated on the basis of the condition information, and
in the controlling step, the execution of the processing regarding the virtual machine is controlled on the basis of a confirmation result of the first electronic signature associated with the virtual machine program.

(14)
An information processing method executed by an information processing apparatus, the method including:
a step for operating a virtual machine; and
a step for writing data on the basis of a writing command acquired from an external device, in which
a virtual machine program that operates the virtual machine is associated with condition information that includes information indicating a region of a recording medium and indicates a condition under which the virtual machine is operated,
in a case where the writing command is acquired from the external device,
in the step for operating the virtual machine, the virtual machine is operated in a case where a region indicated by a parameter of the writing command is a region indicated by the condition information,
in the step for performing writing,
it is determined whether or not all data writing performed on the basis of the writing command can be normally performed,
data is written on the basis of the writing command when it is determined that all the data writing can be normally performed,
data is not written on the basis of the writing command when it is not determined that all the data writing can be normally performed, and
in a case where the virtual machine is operated by the step for operating the virtual machine, the data writing based on the writing command includes data writing performed by the virtual machine program.

(15)
A program for causing a computer to realize a function for controlling execution of processing regarding a virtual machine, in which
a virtual machine program that operates the virtual machine is associated with condition information that includes information indicating a region of a recording medium and indicates a condition under which the virtual machine is operated, a code of the virtual machine program, and a first electronic signature generated on the basis of the condition information, and
the controlling function controls the execution of the processing regarding the virtual machine on the basis of a confirmation result of the first electronic signature associated with the virtual machine program.

(16)
A program for causing a computer to realize:
a function for operating a virtual machine; and
a function for writing data on the basis of a writing command acquired from an external device, in which
a virtual machine program that operates the virtual machine is associated with condition information that includes information indicating a region of a recording medium and indicates a condition under which the virtual machine is operated,
in a case where the writing command is acquired from an external device,
the function for operating the virtual machine operates the virtual machine in a case where a region indicated by a parameter of the writing command is a region indicated by the condition information,
the function for performing writing
determines whether or not all data writing performed on the basis of the writing command can be normally performed, and
writes data on the basis of the writing command when it is determined that all the data writing can be normally performed,
does not write data on the basis of the writing command when it is not determined that all the data writing can be normally performed, and
in a case where the function for operating the virtual machine operates the virtual machine, the data writing based on the writing command includes data writing performed by the virtual machine program.

REFERENCE SIGNS LIST

100 Information processing apparatus
200 Reader/writer
102 Communication unit
104 Control unit
110 Processing unit
1000 Information processing system

The invention claimed is:
1. An information processing apparatus, comprising:
a recording medium configured to store a code of a virtual machine program; and
a processor configured to execute the code of the virtual machine program to control an execution of a first process and a second process regarding a virtual machine, wherein
the virtual machine program is associated with:
condition information that indicates a region of the recording medium, wherein the condition information includes a condition that is satisfied for an operation of the virtual machine, and a first electronic signature that is based on the condition information, the first process corresponds to an installation of the virtual machine, and the control of the execution of the first process of the installation of the virtual machine is based on a confirmation result of the first electronic signature associated with the virtual machine program.

2. The information processing apparatus according to claim 1, wherein the processor is further configured to:

execute the first process and the second process regarding the virtual machine based on a determination that a validity of the first electronic signature is confirmed; and execute an error process based on a determination that the validity of the first electronic signature is not confirmed.

3. The information processing apparatus according to claim 1, wherein the second process corresponds to the operation of the virtual machine based on the condition information.

4. The information processing apparatus according to claim 1, wherein the first electronic signature is based on a key corresponding to the condition information, and the processor is further configured to confirm the first electronic signature based on the key associated with the region which is indicated by the condition information.

5. The information processing apparatus according to claim 1, wherein the processor is further configured to confirm the first electronic signature at one of a time at which the virtual machine is installed or a time after the virtual machine has been installed and before the virtual machine is operated.

6. The information processing apparatus according to claim 1, wherein based on a determination that a plurality of pieces of the condition information is associated with the virtual machine program, the first electronic signature is generated based on:

the code of the virtual machine program, the plurality of pieces of the condition information, and a degeneration key generated based on a plurality of keys respectively corresponding to the plurality of pieces of the condition information.

7. The information processing apparatus according to claim 1, wherein based on a determination that a plurality of pieces of the condition information is associated with the virtual machine program, the virtual machine program that operates the virtual machine is associated with a degeneration electronic signature which is generated based on a plurality of first electronic signatures respectively corresponding to the plurality of pieces of the condition information, the plurality of first electronic signatures includes the first electronic signature, and the processor is further configured to control the execution of the first process and the second process regarding the virtual machine based on a confirmation result of the degeneration electronic signature associated with the virtual machine program.

8. The information processing apparatus according to claim 1, wherein the processor is further configured to control the execution of the first process and the second process regarding the virtual machine based on control information, the control information is associated with a second electronic signature, and the processor is further configured to control the execution of the first process and the second process regarding the virtual machine based on a confirmation result of the second electronic signature.

9. The information processing apparatus according to claim 8, wherein the processor is further configured to confirm the second electronic signature based on a key associated with the region which is indicated by the condition information associated with the virtual machine program that is controlled by using the control information.

10. The information processing apparatus according to claim 1, wherein based on a determination that the condition information which indicates the region for deletion exists after the region of the recording medium is deleted, the processor is further configured to execute a determined process regarding the virtual machine program associated with the condition information which indicates the existence of the region for deletion.

11. The information processing apparatus according to claim 1, wherein the information processing apparatus includes an Integrated Circuit (IC) card.

12. An information processing method, comprising:

in an information processing apparatus that includes a recording medium configured to store a code of a virtual machine program:

executing the code of the virtual machine program to control an execution of a first process and a second process regarding a virtual machine, wherein the virtual machine program is associated with:

condition information that indicates a region of the recording medium, wherein the condition information includes a condition that is satisfied for an operation of the virtual machine, and a first electronic signature that is based on the condition information, the first process corresponds to an installation of the virtual machine, and the execution of the first process of the installation of the virtual machine is controlled based on a confirmation result of the first electronic signature associated with the virtual machine program.

13. A non-transitory computer-readable medium having stored thereon computer-executable instructions, which when executed by a processor of an information processing apparatus, cause the processor to execute operations, the operations comprising:

executing a code of a virtual machine program to control an execution of a first process and a second process regarding a virtual machine, wherein the virtual machine program is associated with:

condition information that indicates a region of a recording medium, wherein the condition information includes a condition that is satisfied for an operation of the virtual machine, and a first electronic signature that is based on the condition information, the first process corresponds to an installation of the virtual machine, and the execution of the first process of the installation of the virtual machine is controlled based on a confirmation result of the first electronic signature associated with the virtual machine program.

14. An information processing apparatus, comprising:

a recording medium configured to store a code of a virtual machine program; and a processor configured to execute the code of the virtual machine program to control an execution of a process regarding a virtual machine, wherein the virtual machine program is associated with:
condition information that indicates a region of the recording medium, wherein the condition information includes a condition that is to be satisfied for an operation of the virtual machine, and
a first electronic signature that is based on the condition information, wherein
in a case where a plurality of pieces of the condition information is associated with the virtual machine program, the first electronic signature is generated based on:
the code of the virtual machine program,
the plurality of pieces of the condition information, and
a degeneration key generated based on a plurality of keys respectively corresponding to the plurality of pieces of the condition information, and
the control of the execution of the process regarding the virtual machine is based on a confirmation result of the first electronic signature associated with the virtual machine program.

* * * * *